United States Patent
Krishnan Gorumkonda et al.

(10) Patent No.: US 12,093,443 B1
(45) Date of Patent: Sep. 17, 2024

(54) GRASPING VIRTUAL OBJECTS WITH REAL HANDS FOR EXTENDED REALITY

(71) Applicant: Snap Inc., Santa Monica, CA (US)

(72) Inventors: Gurunandan Krishnan Gorumkonda, Kirkland, WA (US); Supreeth Narasimhaswamy, East Setauket, NY (US)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 18/385,286

(22) Filed: Oct. 30, 2023

(51) Int. Cl.
| | |
|---|---|
| *G06F 3/01* | (2006.01) |
| *G06T 7/246* | (2017.01) |
| *G06T 7/73* | (2017.01) |
| *G06T 17/20* | (2006.01) |
| *G06T 19/00* | (2011.01) |
| *G06V 40/20* | (2022.01) |
| *G06T 17/00* | (2006.01) |

(52) U.S. Cl.
CPC ............. *G06F 3/011* (2013.01); *G06T 7/251* (2017.01); *G06T 7/75* (2017.01); *G06T 17/20* (2013.01); *G06T 19/006* (2013.01); *G06V 40/28* (2022.01); *G06F 3/017* (2013.01); *G06T 17/00* (2013.01); *G06T 19/003* (2013.01); *G06T 2200/24* (2013.01); *G06T 2207/30196* (2013.01)

(58) Field of Classification Search
CPC . G06F 3/011; G06F 3/017; G06T 7/75; G06T 7/251; G06T 17/20; G06T 17/00; G06T 17/73; G06T 19/006; G06T 19/003; G06T 2200/24; G06T 2207/30196; G06V 40/28
USPC ........................................................ 345/156
See application file for complete search history.

(56) References Cited

U.S. PATENT DOCUMENTS

| | | | |
|---|---|---|---|
| 7,971,156 | B2 | 6/2011 | Albertson et al. |
| 7,996,793 | B2 | 8/2011 | Latta et al. |
| 8,487,938 | B2 | 7/2013 | Latta et al. |
| 8,856,691 | B2 | 10/2014 | Geisner et al. |
| 9,225,897 | B1 | 12/2015 | Sehn et al. |
| 9,230,160 | B1 | 1/2016 | Kanter |
| 9,276,886 | B1 | 3/2016 | Samaranayake |
| 9,705,831 | B2 | 7/2017 | Spiegel |

(Continued)

FOREIGN PATENT DOCUMENTS

| | | |
|---|---|---|
| CN | 103049761 | 8/2016 |
| EP | 3707693 | 9/2020 |

(Continued)

*Primary Examiner* — Tom V Sheng
(74) *Attorney, Agent, or Firm* — SCHWEGMAN LUNDBERG & WOESSNER, P.A.

(57) ABSTRACT

An eXtended Reality (XR) system provides grasp detection of a user grasping a virtual object. The grasp detection may be used as a user input into an XR application. The XR system provides a user interface of the XR application to a user of the XR system, the user interface including one or more virtual objects. The XR system captures video frame tracking data of a pose of a hand of a user while the user interacts with a virtual object of the one or more virtual objects and generates skeletal model data of the hand of the user based on the video frame tracking data. XR system generates grasp detection data based on the skeletal model data and virtual object data of the virtual object, and provides the grasp detection data to the XR application as user input into the XR application.

20 Claims, 12 Drawing Sheets

(56) References Cited

U.S. PATENT DOCUMENTS

| | | |
|---|---|---|
| 9,742,713 B2 | 8/2017 | Spiegel et al. |
| 10,102,423 B2 | 10/2018 | Shaburov et al. |
| 10,284,508 B1 | 5/2019 | Allen et al. |
| 10,439,972 B1 | 10/2019 | Spiegel et al. |
| 10,509,466 B1 | 12/2019 | Miller et al. |
| 10,514,876 B2 | 12/2019 | Sehn |
| 10,579,869 B1 | 3/2020 | Xiong et al. |
| 10,614,855 B2 | 4/2020 | Huang |
| 10,748,347 B1 | 8/2020 | Li et al. |
| 10,958,608 B1 | 3/2021 | Allen et al. |
| 10,962,809 B1 | 3/2021 | Castañeda |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,169,600 B1 | 11/2021 | Canberk et al. |
| 11,227,626 B1 | 1/2022 | Krishnan Gorumkonda et al. |
| 11,307,747 B2 | 4/2022 | Dancie et al. |
| 11,531,402 B1 | 12/2022 | Stolzenberg |
| 11,546,505 B2 | 1/2023 | Canberk |
| 2009/0012788 A1 | 1/2009 | Gilbert et al. |
| 2011/0301934 A1 | 12/2011 | Tardif |
| 2012/0155705 A1* | 6/2012 | Latta .................. G06F 3/017 382/103 |
| 2012/0162384 A1* | 6/2012 | Vesely ................ G06F 3/012 348/47 |
| 2014/0171036 A1 | 6/2014 | Simmons |
| 2015/0120293 A1 | 4/2015 | Wohlert et al. |
| 2015/0370320 A1 | 12/2015 | Connor |
| 2016/0026253 A1* | 1/2016 | Bradski .............. H04N 13/128 345/8 |
| 2017/0123487 A1 | 5/2017 | Hazra et al. |
| 2017/0140552 A1* | 5/2017 | Woo .................. G06F 3/0304 |
| 2017/0277684 A1 | 9/2017 | Dharmarajan Mary |
| 2017/0277685 A1 | 9/2017 | Takumi |
| 2017/0351910 A1 | 12/2017 | Elwazer et al. |
| 2018/0158370 A1 | 6/2018 | Pryor |
| 2019/0094981 A1* | 3/2019 | Bradski ............... H04N 21/414 |
| 2019/0362562 A1* | 11/2019 | Benson ............... G06F 3/04815 |
| 2020/0097071 A1* | 3/2020 | Johnston ............ G02B 27/0176 |
| 2020/0311396 A1* | 10/2020 | Pollefeys ................ G06T 19/20 |
| 2020/0311397 A1* | 10/2020 | Sawhney ............... G06V 10/40 |
| 2021/0011612 A1 | 1/2021 | Dancie et al. |
| 2021/0074016 A1 | 3/2021 | Li et al. |
| 2021/0166732 A1 | 6/2021 | Shaburova et al. |
| 2021/0174034 A1 | 6/2021 | Retek et al. |
| 2021/0241529 A1 | 8/2021 | Cowburn et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0382564 A1 | 12/2021 | Blachly et al. |
| 2021/0397000 A1 | 12/2021 | Rodriguez, II |
| 2021/0405761 A1 | 12/2021 | Canberk |
| 2022/0188539 A1 | 6/2022 | Chan et al. |
| 2022/0206588 A1 | 6/2022 | Canberk et al. |
| 2022/0300730 A1 | 9/2022 | Eirinberg et al. |
| 2022/0300731 A1 | 9/2022 | Eirinberg et al. |
| 2022/0326781 A1 | 10/2022 | Hwang et al. |
| 2022/0334649 A1 | 10/2022 | Hwang et al. |
| 2023/0341948 A1* | 10/2023 | Colascione ........ G02B 27/0172 |
| 2024/0070992 A1* | 2/2024 | Lucas .................... G06T 7/70 |
| 2024/0070994 A1* | 2/2024 | Mahalingam .......... G06T 7/246 |
| 2024/0070995 A1* | 2/2024 | Mahalingam ....... G06F 3/04845 |

FOREIGN PATENT DOCUMENTS

| | | |
|---|---|---|
| KR | 20220158824 | 12/2022 |
| WO | 2016168591 | 10/2016 |
| WO | 2019094618 | 5/2019 |
| WO | 2022005687 | 1/2022 |
| WO | 2022005693 | 1/2022 |
| WO | 2022060549 | 3/2022 |
| WO | 2022066578 | 3/2022 |
| WO | 2022132381 | 6/2022 |
| WO | 2022146678 | 7/2022 |
| WO | 2022198182 | 9/2022 |
| WO | 2022216784 | 10/2022 |
| WO | 2022225761 | 10/2022 |
| WO | 2022245765 | 11/2022 |

* cited by examiner

GRASPING VIRTUAL OBJECTS WITH REAL HANDS FOR EXTENDED REALITY

TECHNICAL FIELD

The present disclosure relates generally to user interfaces and more particularly to user interfaces used for augmented or virtual reality.

BACKGROUND

A head-wearable apparatus may be implemented with a transparent or semi-transparent display through which a user of the head-wearable apparatus can view the surrounding environment. Such head-wearable apparatuses enable a user to see through the transparent or semi-transparent display to view the surrounding environment, and to also see objects (e.g., virtual objects such as a rendering of a 2D or 3D graphic model, images, video, text, and so forth) that are generated for display to appear as a part of, and/or overlaid upon, the surrounding environment. This is typically referred to as "augmented reality" or "AR." A head-wearable apparatus may additionally completely occlude a user's visual field and display a virtual environment through which a user may move or be moved. This is typically referred to as "virtual reality" or "VR." In a hybrid form, a view of the surrounding environment is captured using cameras, and then that view is displayed along with augmentation to the user on displays the occlude the user's eyes. As used herein, the term eXtended Reality (XR) refers to augmented reality, virtual reality and any of hybrids of these technologies unless the context indicates otherwise.

A user of the head-wearable apparatus may access and use a computer software application to perform various tasks or engage in an entertaining activity. To use the computer software application, the user interacts with a user interface provided by the head-wearable apparatus.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1A:
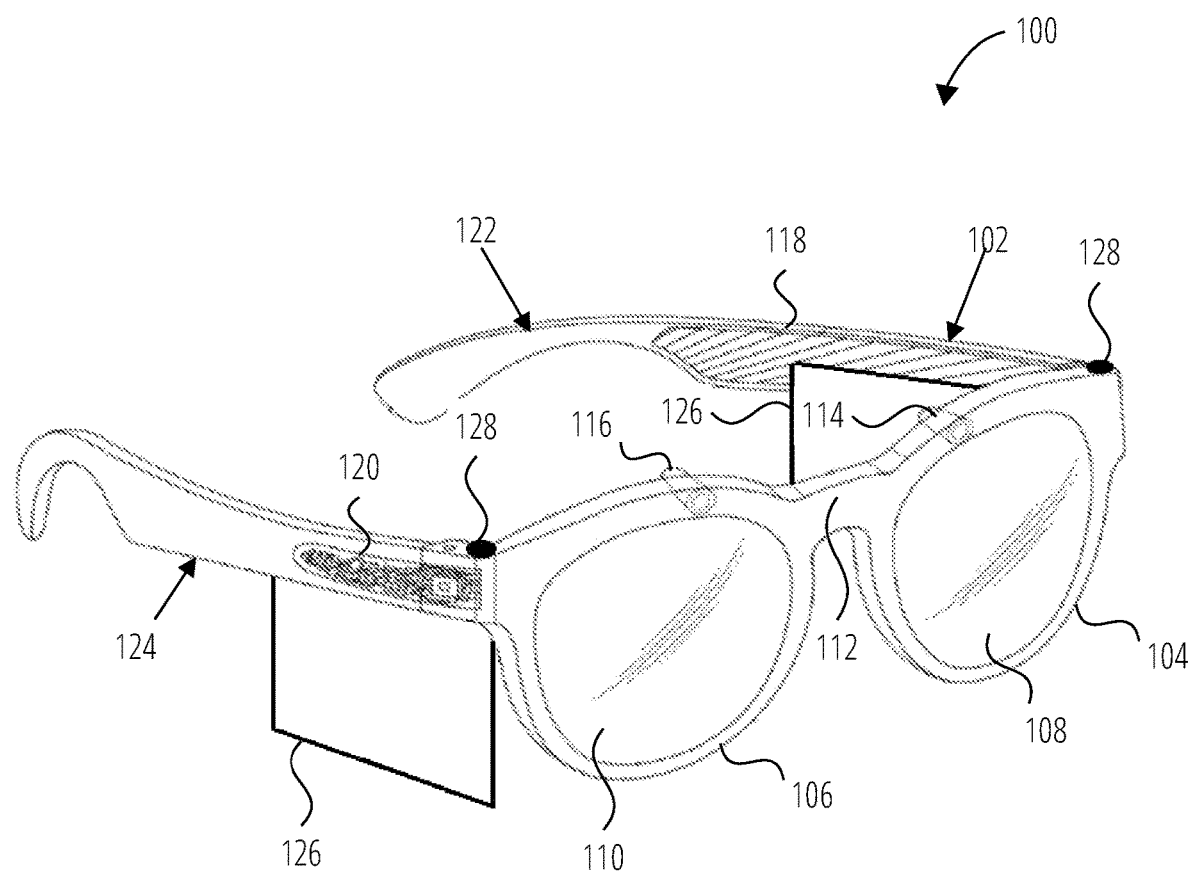
FIG. 1A is a perspective view of a head-worn device, in accordance with some examples.

In some XR scenarios, users interact with virtual objects using their hands. For example, consider a person playing an XR game trying to pick up virtual weapons. Or, consider a case where a user is trying to move a virtual coffee maker from one location to another. In both these cases, the user selects the virtual object and then starts interacting with the object. While several methods exist to select the object, the most popular method involves using a pinch gesture. Specifically, the user points their hand in the direction of the object and then performs a pinch gesture to select the object. Once they select the object, they can drag it to a different location and release the pinch to unselect it. While object selection using pinch gestures is simple, it is not a natural interaction method. In the real world, humans grasp different objects differently depending on the object's geometry and intent with the object. For example, consider a person trying to interact with a knife. They will hold the knife by its handle if they plan to use it to cut vegetables, and they will likely hold it by the blade if they hand over the knife to a different person. Notably, the user's grasp depends on the knife's geometrical properties, such as size and shape.

To generate an immersive XR experience, it is desirable to enable richer methods allowing users to interact with virtual objects naturally. For example, consider an XR experience where two people simultaneously interact with a virtual kettle rendered to be sitting on a table. Suppose the interaction involves one person picking up the virtual kettle from the table top and handing it over to the second person. The experience will be realistic and immersive if the first person can grasp the virtual kettle by its handle, lift it from the table, and pass it to the other person who can hold the kettle, similar to a real object. A first step towards achieving this immersive experience is enabling users to grasp virtual objects naturally. Several methods have been proposed to select virtual objects, but none enables realistic and natural hand-object grasping. Grasping virtual objects is different compared to real objects. There is physical feedback when a person grasps real objects with their hands. For example, they can feel the object once they contact the object's surface. Also, the hand's tissues undergo deformation when they apply forces to the object, and the object exerts an opposite force on their hand.

Notably, a grasping process is governed by the laws of physics. For example, it is impossible to grasp an object without contacting the object, the hand and object cannot interpenetrate, and the forces exerted on the object should constitute form or force closure. However, since virtual objects do not have any physical surface, designing a system that lets users grasp and interact with virtual objects is challenging. First, since virtual objects have no physical boundaries, the system should be flexible and allow under-grasps and over-grasps. Under-grasps are grasping cases where the user is trying to grasp the object by enclosing their hand around it, but there is no contact between the hand mesh and the object mesh. Similarly, over-grasps are rasping cases where there are collisions or interpenetrations between hand and object meshes. Second, since there is no touch feedback from virtual objects, it is desirable to provide audio or visual feedback whenever the user grasps the object using their hands.

The present disclosure provides methodologies where users can naturally grasp a virtual object using their hands. An XR system comprises a hand-tracking component that outputs three-dimensional locations of hand joint and a hand-object grasp classification component that identifies whether the user's hand is grasping the virtual object. The inputs to the grasp classification component are three-dimensional locations of 21 hand joints from the hand-tracking component and three-dimensional vertices on the virtual object's mesh surface. The output of the grasp classification is a binary decision indicating the presence or absence of the grasp. An additional component is an audio-visual feedback mechanism that lets the user know when they grasp the object.

In some examples, an XR system provides a user interface to a user of the XR system, the user interface including one or more virtual objects. The XR system captures, using one or more cameras of the XR system, video frame tracking data of a pose of a hand of a user while the user interacts with a virtual object of the one or more virtual objects and generates skeletal model data of the hand of the user based on the video frame tracking data, the skeletal model data including one or more skeletal model features corresponding to recognized visual landmarks of portions of the hand of the user. The XR system generates grasp detection data based on the skeletal model data and virtual object data of the virtual object, and provides the grasp detection data to the XR application as user input into the XR application.

In some examples, the skeletal model data further includes three-dimensional locations of hand joints and the virtual object data includes three-dimensional vertices on the virtual object's mesh surface.

In some examples, the grasp detection data includes a radius of curvature of a grasp being made by the user.

In some examples, the grasp detection data includes a binary indication of the user grasping the virtual object.

In some examples, the grasp detection data includes a grasp confidence level of the user grasping the virtual object.

In some examples, the grasp detection data includes a grasp type of a grasp being made by the user grasping the virtual object.

Other technical features may be readily apparent to one skilled in the art from the following figures, descriptions, and claims.

FIG. 1A is a perspective view of a head-wearable apparatus 100 in accordance with some examples. The head-wearable apparatus 100 may be a client device of an XR system, such a computing system 502 of FIG. 5. The head-wearable apparatus 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the head-wearable apparatus 100.

The frame 102 additionally includes a left arm or left temple piece 122 and a right arm or right temple piece 124. In some examples the frame 102 can be formed from a single piece of material so as to have a unitary or integral construction.

The head-wearable apparatus 100 can include a computing device, such as a computer 120, which can be of any suitable type so as to be carried by the frame 102 and, in one or more examples, of a suitable size and shape, so as to be partially disposed in one of the left temple piece 122 or the right temple piece 124. The computer 120 can include one or more processors with memory, wireless communication circuitry, and a power source. As discussed below, the computer 120 comprises low-power circuitry, high-speed circuitry, and a display processor. Various other examples may include these elements in different configurations or integrated together in different ways. Additional details of aspects of the computer 120 may be implemented as illustrated by the machine 200 discussed below.

The computer 120 additionally includes a battery 118 or other suitable portable power supply. In some examples, the battery 118 is disposed in left temple piece 122 and is electrically coupled to the computer 120 disposed in the right temple piece 124. The head-wearable apparatus 100 can include a connector or port (not shown) suitable for charging the battery 118, a wireless receiver, transmitter or transceiver (not shown), or a combination of such devices.

The head-wearable apparatus 100 includes a first or left camera 114 and a second or right camera 116. Although two cameras are depicted, other examples contemplate the use of a single or additional (i.e., more than two) cameras. In some examples, the head-wearable apparatus 100 includes one or more visible light cameras, an infrared emitter, and an infrared camera. In one or more examples, the head-wearable apparatus 100 includes any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide video frame tracking data for use by the head-wearable apparatus 100 to extract 3D information from a real-world scene.

The head-wearable apparatus 100 may also include a touchpad 126 mounted to or integrated with one or both of the left temple piece 122 and right temple piece 124. The touchpad 126 is generally vertically-arranged, approximately parallel to a user's temple in some examples. As used herein, generally vertically aligned means that the touchpad is more vertical than horizontal, although potentially more vertical than that. Additional user input may be provided by one or more buttons 128, which in the illustrated examples are provided on the outer upper edges of the left optical element holder 104 and right optical element holder 106. The one or more touchpads 126 and buttons 128 provide a means whereby the head-wearable apparatus 100 can receive input from a user of the head-wearable apparatus 100.

Figure 1B:
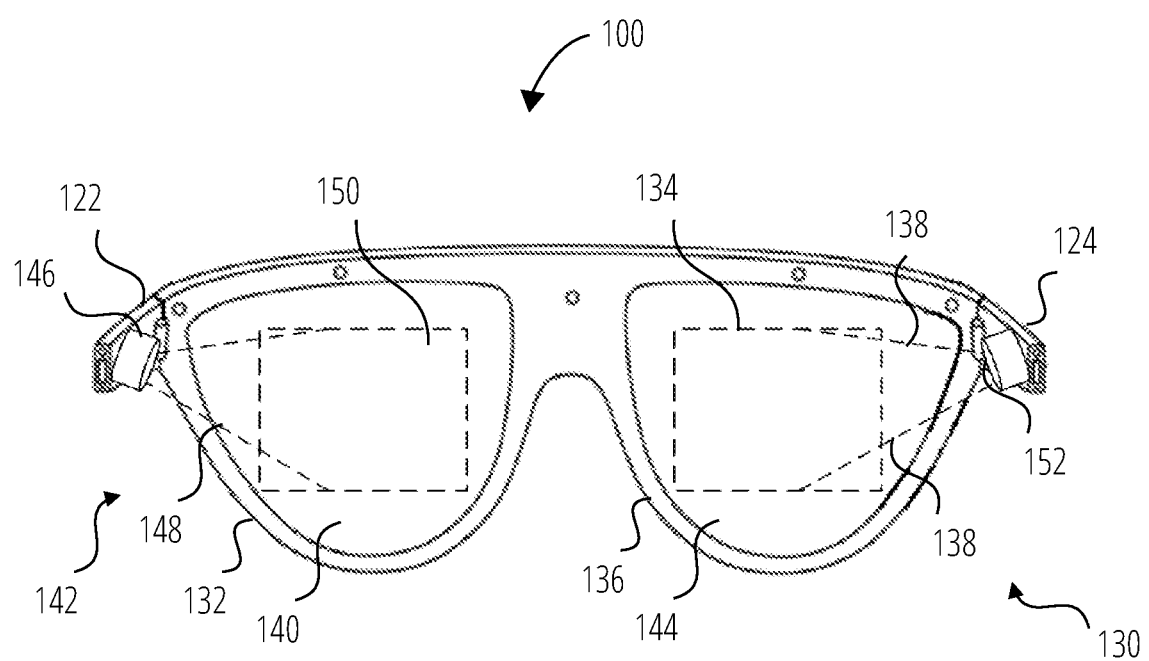
FIG. 1B illustrates a further view of the head-worn device of FIG. 1A, in accordance with some examples.

FIG. 1B illustrates the head-wearable apparatus 100 from the perspective of a user while wearing the head-wearable apparatus 100. For clarity, a number of the elements shown in FIG. 1A have been omitted. As described in FIG. 1A, the head-wearable apparatus 100 shown in FIG. 1B includes left optical element 140 and right optical element 144 secured within the left optical element holder 132 and the right optical element holder 136 respectively.

The head-wearable apparatus 100 includes right forward optical assembly 130 comprising a left near eye display 150, a right near eye display 134, and a left forward optical assembly 142 including a left projector 146 and a right projector 152.

In some examples, the near eye displays are waveguides. The waveguides include reflective or diffractive structures (e.g., gratings and/or optical elements such as mirrors, lenses, or prisms). Light 138 emitted by the right projector 152 encounters the diffractive structures of the waveguide of the right near eye display 134, which directs the light towards the right eye of a user to provide an image on or in the right optical element 144 that overlays the view of the real-world scene seen by the user. Similarly, light 148 emitted by the left projector 146 encounters the diffractive structures of the waveguide of the left near eye display 150, which directs the light towards the left eye of a user to provide an image on or in the left optical element 140 that overlays the view of the real-world scene seen by the user. The combination of a GPU, the right forward optical assembly 130, the left optical element 140, and the right optical element 144 provide an optical engine of the head-wearable apparatus 100. The head-wearable apparatus 100 uses the optical engine to generate an overlay of the real-world scene view of the user including display of a user interface to the user of the head-wearable apparatus 100.

It will be appreciated however that other display technologies or configurations may be utilized within an optical engine to display an image to a user in the user's field of view. For example, instead of a grasp detection pipeline 338 and a waveguide, an LCD, LED or other display panel or surface may be provided.

In use, a user of the head-wearable apparatus 100 will be presented with information, content and various user interfaces on the near eye displays. As described in more detail herein, the user can then interact with the head-wearable apparatus 100 using a touchpad 126 and/or the button 128, voice inputs or touch inputs on an associated device (e.g. mobile device 514 illustrated in FIG. 6), and/or hand movements, locations, and positions recognized by the head-wearable apparatus 100.

In some examples, an optical engine of an XR system is incorporated into a lens that is contact with a user's eye, such as a contact lens or the like. The XR system generates images of an XR experience using the contact lens.

In some examples, the head-wearable apparatus 100 comprises an XR system. In some examples, the head-wearable apparatus 100 is a component of an XR system including additional computational components. In some examples, the head-wearable apparatus 100 is a component in an XR system comprising additional user input systems or devices.

Machine Architecture

Figure 2:
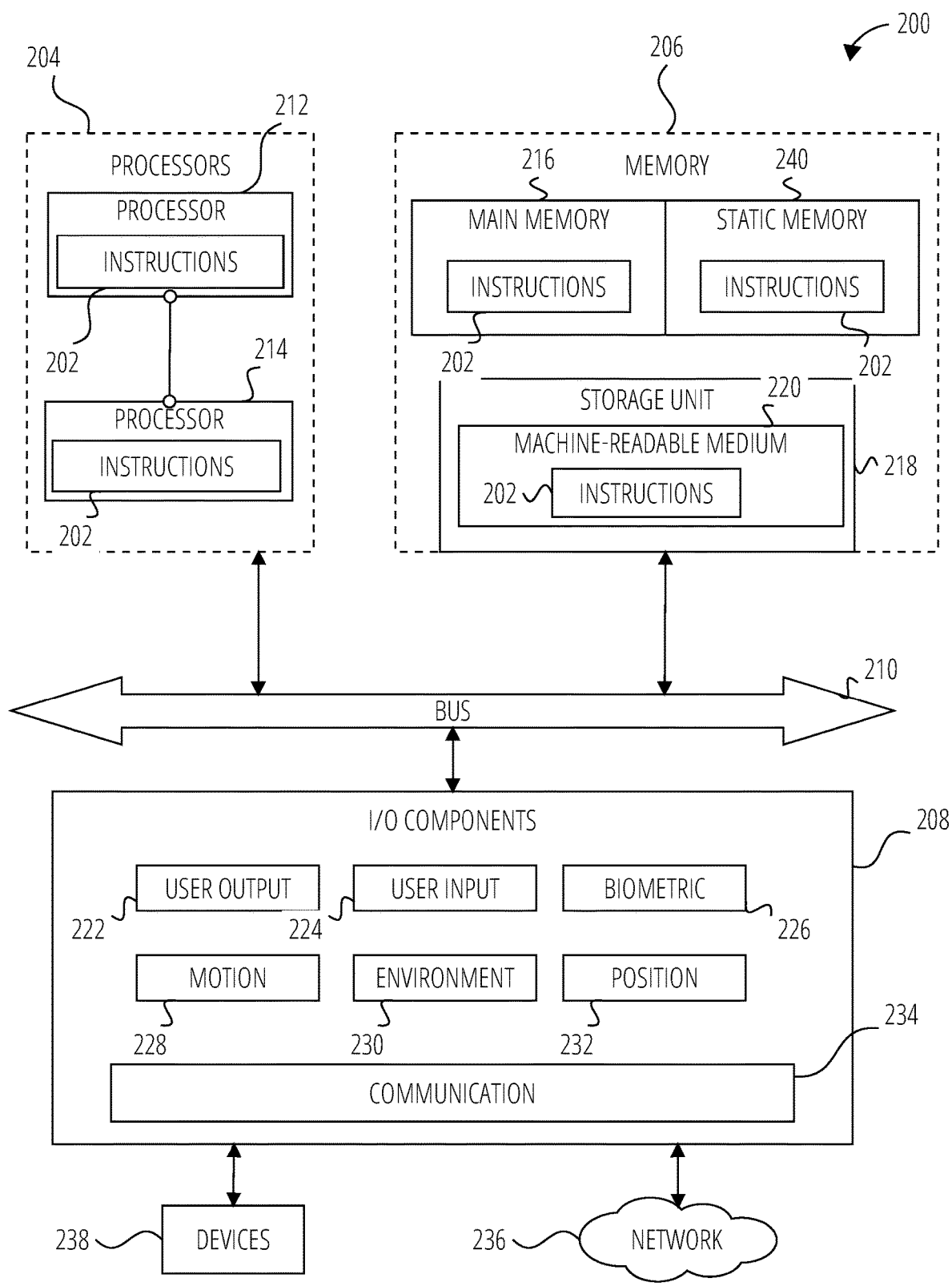
FIG. 2 is a diagrammatic representation of a machine in the form of a computer system within which a set of instructions may be executed to cause the machine to perform any one or more of the methodologies discussed herein, according to some examples.

FIG. 2 is a diagrammatic representation of the machine 200 within which instructions 202 (e.g., software, a program, an application, an applet, an app, or other executable code) for causing the machine 200 to perform any one or more of the methodologies discussed herein may be executed. For example, the instructions 202 may cause the machine 200 to execute any one or more of the methods described herein. The instructions 202 transform the general, non-programmed machine 200 into a particular machine 200 programmed to carry out the described and illustrated functions in the manner described. The machine 200 may operate as a standalone device or may be coupled (e.g., networked) to other machines. In a networked deployment, the machine 200 may operate in the capacity of a server machine or a client machine in a server-client network environment, or as a peer machine in a peer-to-peer (or distributed) network environment. The machine 200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 202, sequentially or otherwise, that specify actions to be taken by the machine 200. Further, while a single machine 200 is illustrated, the term "machine" shall also be taken to include a collection of machines that individually or jointly execute the instructions 202 to perform any one or more of the methodologies discussed herein. The machine 200, for example, may comprise the computing system 502 or any one of multiple server devices forming part of the interaction server system 510. In some examples, the machine 200 may also comprise both client and server systems, with certain operations of a particular method or algorithm being performed on the server-side and with certain operations of the particular method or algorithm being performed on the client-side.

The machine 200 may include processors 204, memory 206, and input/output I/O components 208, which may be configured to communicate with each other via a bus 210. In an example, the processors 204 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 212 and a processor 214 that execute the instructions 202. The term "processor" is intended to include multi-core processors that may comprise two or more independent processors (sometimes referred to as "cores") that may execute instructions contemporaneously. Although FIG. 2 shows multiple processors 204, the machine 200 may include a single processor with a single-core, a single processor with multiple cores (e.g., a multi-core processor), multiple processors with a single core, multiple processors with multiples cores, or any combination thereof.

The memory 206 includes a main memory 216, a static memory 240, and a storage unit 218, both accessible to the processors 204 via the bus 210. The main memory 206, the static memory 240, and storage unit 218 store the instructions 202 embodying any one or more of the methodologies or functions described herein. The instructions 202 may also reside, completely or partially, within the main memory 216, within the static memory 240, within machine-readable medium 220 within the storage unit 218, within at least one of the processors 204 (e.g., within the processor's cache memory), or any suitable combination thereof, during execution thereof by the machine 200.

The I/O components 208 may include a wide variety of components to receive input, provide output, produce output, transmit information, exchange information, capture measurements, and so on. The specific I/O components 208 that are included in a particular machine will depend on the type of machine. For example, portable machines such as mobile phones may include a touch input device or other such input mechanisms, while a headless server machine will likely not include such a touch input device. It will be appreciated that the I/O components 208 may include many other components that are not shown in FIG. 2. In various examples, the I/O components 208 may include user output components 222 and user input components 224. The user output components 222 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 224 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 208 may include biometric components 226, motion components 228, environmental components 230, or position components 232, among a wide array of other components. For example, the biometric components 226 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 228 include acceleration sensor components (e.g., accelerometer), gravitation sensor components, rotation sensor components (e.g., gyroscope).

The environmental components 230 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), depth or distance sensors (e.g., sensors to determine a distance to an object or a depth in a 3D coordinate system of features of an object), or other components that may provide indications, measurements, or signals corresponding to a surrounding physical environment.

With respect to cameras, the computing system 502 may have a camera system comprising, for example, front cameras on a front surface of the computing system 502 and rear cameras on a rear surface of the computing system 502. The front cameras may, for example, be used to capture still images and video of a user of the computing system 502 (e.g., "selfies"), which may then be augmented with augmentation data (e.g., filters) described above. The rear cameras may, for example, be used to capture still images and videos in a more traditional camera mode, with these images similarly being augmented with augmentation data.

In addition to front and rear cameras, the computing system 502 may also include a 3600 camera for capturing 360° photographs and videos.

Further, the camera system of the computing system 502 may include dual rear cameras (e.g., a primary camera as well as a depth-sensing camera), or even triple, quad or penta rear camera configurations on the front and rear sides of the computing system 502. These multiple cameras systems may include a wide camera, an ultra-wide camera, a telephoto camera, a macro camera, and a depth sensor, for example.

The position components 232 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 208 further include communication components 234 operable to couple the machine 200 to a network 236 or devices 238 via respective coupling or connections. For example, the communication components 234 may include a network interface component or another suitable device to interface with the network 236. In further examples, the communication components 234 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 238 may be another machine or any of a wide variety of peripheral devices (e.g., a peripheral device coupled via a USB).

Moreover, the communication components 234 may detect identifiers or include components operable to detect identifiers. For example, the communication components 234 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 234, such as location via Internet Protocol (IP) geolocation, location via Wi-Fi® signal triangulation, location via detecting an NFC beacon signal that may indicate a particular location, and so forth.

The various memories (e.g., main memory 216, static memory 240, and memory of the processors 204) and storage unit 218 may store one or more sets of instructions and data structures (e.g., software) embodying or used by any one or more of the methodologies or functions described herein. These instructions (e.g., the instructions 202), when executed by processors 204, cause various operations to implement the disclosed examples.

The instructions 202 may be transmitted or received over the network 236, using a transmission medium, via a network interface device (e.g., a network interface component included in the communication components 234) and using any one of several well-known transfer protocols (e.g., hypertext transfer protocol (HTTP)). Similarly, the instructions 202 may be transmitted or received using a transmission medium via a coupling (e.g., a peer-to-peer coupling) to the devices 238.

Figure 3A:
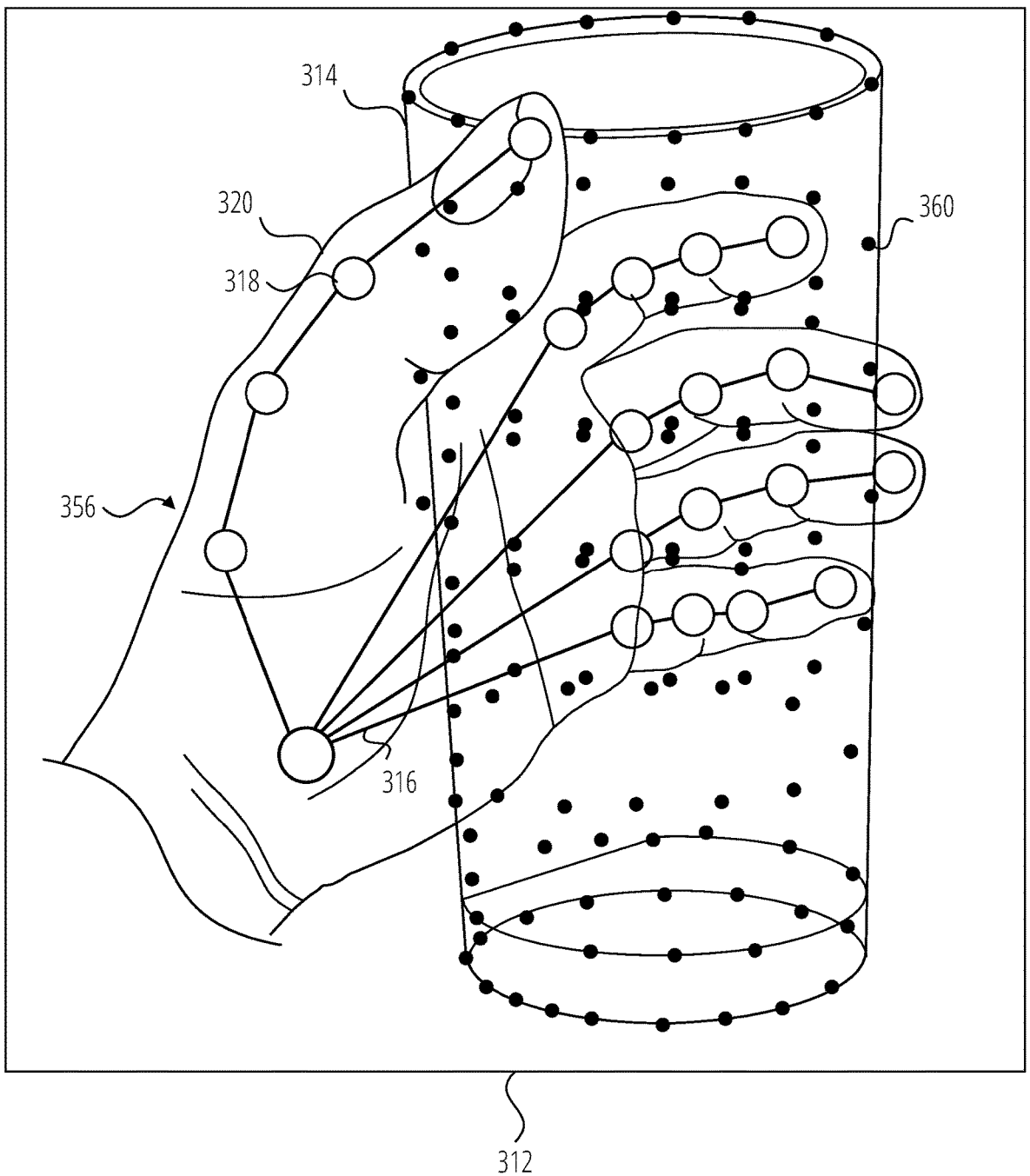
FIG. 3A is an illustration of a portion of an XR user interface, in accordance with some examples.
Figure 3B:
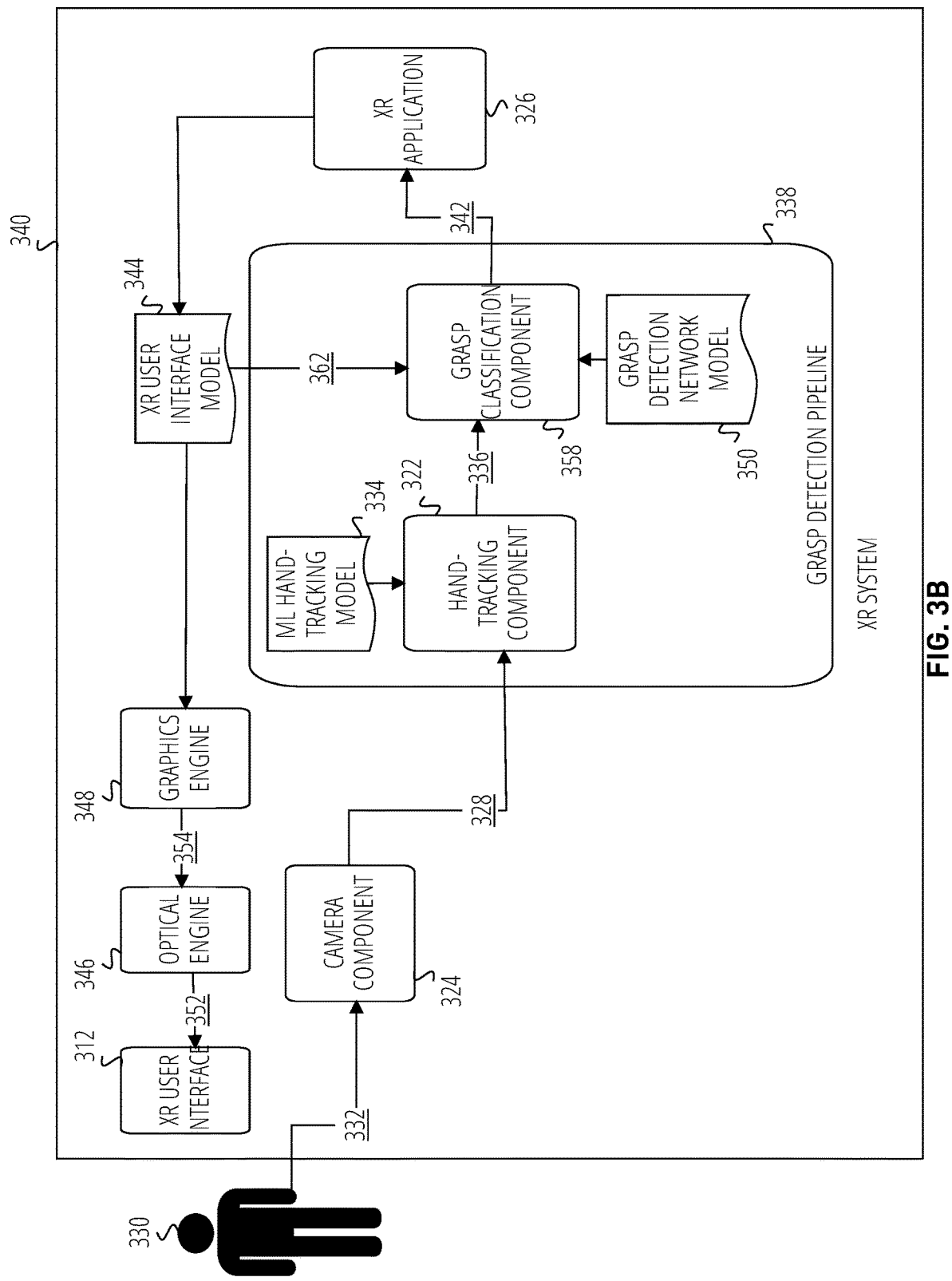
FIG. 3B is collaboration diagram of components of an XR system providing an XR user interface, in accordance with some examples.
Figure 3C:
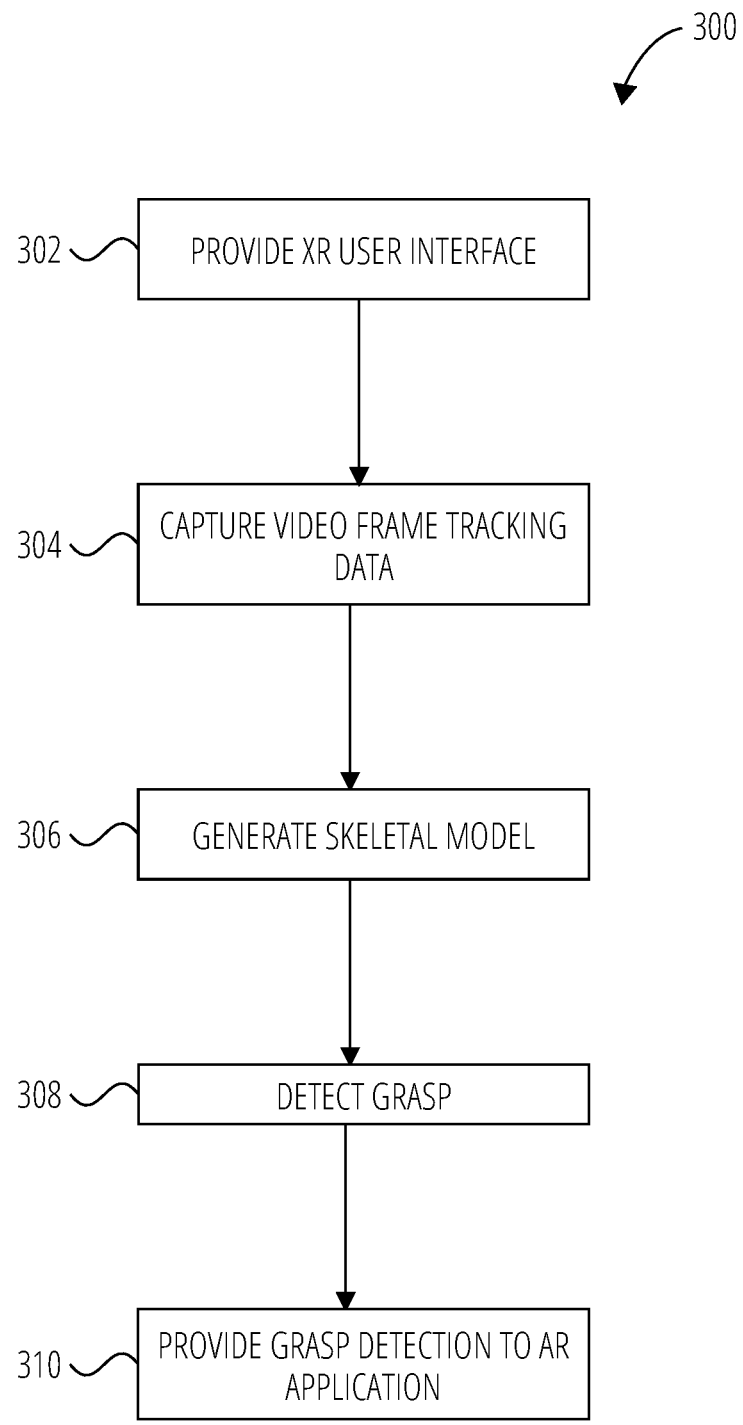
FIG. 3C is an activity diagram of a grasp detection method used by the XR system to provide user inputs to the XR user interface, in accordance with some examples.

FIG. 3A is an illustration of an XR user interface, FIG. 3B is collaboration diagram of components of an XR system providing the XR user interface, and FIG. 3C is an activity diagram of a grasp detection method used by the XR system to detect a user's grasp of a virtual object, in accordance with some examples.

Although a grasp detection method 300 of FIG. 3A depicts a particular sequence of operations, the sequence may be altered without departing from the scope of the present disclosure. For example, some of the operations depicted may be performed in parallel, in a different sequence, or by different components of an XR system, that does not materially affect the function of the method.

As shown in FIG. 3B, an XR system 340 includes a grasp detection pipeline 338 that captures video frame tracking data 328 of hand poses 332 being made by a user 330 as the user 330 interacts with a virtual object 314 (of FIG. 3A) of an XR application 326.

In operation 302 of FIG. 3C, an XR application 326, such as shown in FIG. 3B, of the XR system 340 provides an XR user interface 312 to a user 330. The XR user interface 312 includes one or more virtual objects 314, as shown in FIG. 3A, that the user 330 interacts with to provide input into the XR user interface 312. For example, the XR application 326 generates one or more virtual objects, such as virtual object 314, that are included in the XR user interface model 344. The one or more virtual objects are represented internally in an XR user interface model 344 as a mesh comprised of vertices, edges, and faces that define the one or more virtual objects. The meshes of the one or more virtual objects are represented in the XR user interface model 344 using 3D coordinates in a 3D coordinate system of the XR user interface model 344. The one or more virtual objects comprise interactive components of the XR user interface 312 provided to the user 330 by the XR application 326. The one or more virtual objects are rendered by a graphics engine 348 of the XR system 340 that generates XR experience video data 354 based on the meshes of the one or more virtual objects. The graphics engine 348 communicates the XR experience video data 354 to an optical engine 346 of the XR system 340. The optical engine 346 generates images 352 that are displayed to the user 330 as part of an XR user interface 312 that is part of an XR experience. The user 330 interacts with the one or more virtual objects of the XR user interface 312 using hand poses 332 to grasp and manipulate the virtual objects.

In operation 304, the XR system 340 captures video frame tracking data 328 of a hand 356 of the user 330 from a perspective of the user 330 as the user 330 grasps and interacts the virtual object 314. To capture the video frame tracking data 328, the XR system 340 uses one or more cameras, such as cameras 114 and 116 of FIG. 1A, of a camera component 324 of the XR system 340. The camera component 324 generates video frame tracking data 328 based on the captured video data of the hand poses 332 being made by the user 330. The video frame tracking data 328 includes video data of detectable portions of the hand 356 of the user 330 as the user 330 makes hand poses 332 while interacting with the virtual object 314 of the XR user interface 312. The camera component 324 communicates the video frame tracking data 328 to a hand-tracking component 322 as shown in FIG. 3B.

In some examples, inputs to the grasp detection pipeline 338 are stereo-pair images captured from two egocentric cameras on the head-wearable apparatus 100, such as left camera 114 and right camera 116 (of FIG. 1A). In some examples, the video frame tracking data 328 includes Red Green Blue (RGB) images. In some examples, the video frame tracking data 328 includes depth images comprising depth data for portions of the user's hand 356.

In operation 306, the hand-tracking component 322 receives the video frame tracking data 328 from the camera component 324 and generates skeletal model data 336 based on the video frame tracking data 328. For example, the hand-tracking component 322 recognizes landmark features on portions of the hand 356 of the user 330 captured in the video frame tracking data 328. In some examples, the hand-tracking component 322 extracts landmarks of the user's hand 356 from the video frame tracking data 328 using computer vision methodologies including, but not limited to, Harris corner detection, Shi-Tomasi corner detection, Scale-Invariant Feature Transform (SIFT), Speeded-Up Robust Features (SURF), Features from Accelerated Segment Test (FAST), Oriented FAST and Rotated BRIEF (ORB), and the like.

The hand-tracking component 322 generates data of a sequence of skeletal models, such as skeletal model 316 of FIG. 3B, in a 3D coordinate system based on the landmark features extracted from the video frame tracking data 328. The skeletal models comprise skeletal model features, such as node 318, that correspond to recognized visual landmarks, such as landmark 320 of portions of the hand 356 of the user 330, such as landmark 320. In some examples, the skeletal model data 336 includes landmark data such as landmark identification, a physical location of the landmark, segments between joints of the user's fingers, and categorization information of one or more landmarks associated with the hand 356 of the user 330. The skeletal model data 336 includes a temporal sequence of skeletal models comprising skeletal model features where each skeletal model feature has a set of 3D coordinates in a common 3D coordinate system of the XR user interface model 344. In some examples, the skeletal model data 336 comprises three-dimensional locations of 21 hand joints.

In some examples, the hand-tracking component 322 generates the skeletal model data 336 based on the landmarks extracted from the video frame tracking data 328 using artificial intelligence methodologies and an ML hand-tracking model 334 that was previously generated using machine learning methodologies. In some examples, an ML hand-tracking model 334 comprises, but is not limited to, a neural network, a learning vector quantization network, a logistic regression model, a support vector machine, a random decision forest, a naïve Bayes model, a linear discriminant analysis model, and a K-nearest neighbor model. In some examples, machine learning methodologies used to generate the ML hand-tracking model 334 may include, but are not limited to, supervised learning, unsupervised learning, semi-supervised learning, reinforcement learning, dimensionality reduction, self-learning, feature learning, sparse dictionary learning, and anomaly detection.

In operation 308, a grasp classification component 358 receives the skeletal model data 336 and generates grasp detection data 342 indicating whether the user 330 is grasping the virtual object 314 provided by the XR application 326 based on the skeletal model data 336 and virtual object data 362 of the XR user interface model 344 using a grasp detection network model 350. In some examples, the grasp detection data 342 includes a binary indicator of whether the grasp classification component 358 has detected that the user is grasping the virtual object 314. In some examples, the grasp detection data 342 includes a grasp confidence level of a grasp detection. In some examples, the grasp detection data 342 includes a grasp classification of a grasp type of a grasp the user 330 is making while the user 330 is grasping the virtual object. Grasp types may include, but are not limited to, grasps indicated in a grasp taxonomy illustrated in FIG. 4. In some examples, the grasp detection data 342 includes a radius of curvature of a grasp being made by the user 330.

In some examples, the hand-tracking component 322 generates the grasp detection data 342 based on the skeletal model data 336 and virtual object data 362 of the XR user interface model 344 provided by the XR application 326 using artificial intelligence methodologies and the grasp detection network model 350 that was previously generated using machine learning methodologies. In some examples, a grasp detection network model 350 comprises, but is not limited to, a neural network, a learning vector quantization network, a logistic regression model, a support vector machine, a random decision forest, a naïve Bayes model, a linear discriminant analysis model, and a K-nearest neighbor model. In some examples, machine learning methodologies used to generate the ML hand-tracking model 334 may include, but are not limited to, supervised learning, unsupervised learning, semi-supervised learning, reinforcement learning, dimensionality reduction, self-learning, feature learning, sparse dictionary learning, and anomaly detection.

In some examples, the grasp classification network grasp detection network model 350 and skeletal model data 336 are based on the PointNet architecture that is specialized for working on classification of 3D point clouds.

In some examples, the inputs to the grasp classification component 358 are three dimensional locations of the hand joints included in the skeletal model data 336 and a set of vertices, such as vertex 360, sampled from 3D mesh data of the virtual object 314 included in the virtual object data 362 of the XR user interface model 344. The output is a binary number indicating the presence or absence of a grasp for the hand and object configuration and is included in the grasp detection data 342. For example, an input for the grasp classification component 358 is a set of three-dimensional locations of 21 hand joints $H_j \in R^{21 \times 3}$ obtained from the hand-tracking component 322. An additional input is the set of n three-dimensional vertices $O_v \in R^{n \times 3}$ sampled from a mesh surface of the virtual object 314. The inputs are then used to construct a single input representation $X \in R^{n \times 4}$ that encodes the vertices of the virtual object 314 as a three-dimensional point cloud and also pairwise distances between hand joints and the vertices of the virtual object 314. For example, the ith row of X is generated by concatenating the ith object vertices with its pairwise Euclidean distance to all the 21 hand joints:

$$X^{(i)} := [O_v^{(i)}, L2(O_v^{(i)}, H_j)]$$

In the above, $O_v^{(i)} \in R^3$ denotes the $i^{th}$ object vertex and $L2(O_v^{(i)}, H_j) \in R^{21}$ denotes the pairwise distances between the the $i^{th}$ object vertex and all the 21 hand joints.

In some examples, the grasp detection network model 350 is trained to classify grasps using a Virtual-Object-Grasping (VOG) dataset. Specifically, given the input representation $X \in R^{n \times 24}$ obtained from the hand joints and object vertices, a grasp detection network model 350 is used to obtain the grasp confidence score $f(X) \in [0,1]$. For example, a groundtruth grasp is denoted by $Y \in \{0,1\}$ and the grasp detection network model 350 is trained using the following binary cross-entropy loss: $L = -Y \log f(X) - (1-Y) \log(1-f(X))$.

In some examples, a subset of vertices of a mesh of a virtual object is used to detect a grasp of a user of the virtual object. In some examples, the subset of vertices is a proper subset of a set of vertices of the mesh. In some examples, members of the subset of vertices are sampled from the set of vertices of the mesh based on a random process. In some examples, members of the subset of vertices are sampled from the set of vertices of the mesh based on a non-random process. In some examples, members of the subset of vertices are sampled from the set of vertices of the mesh to create a portion of the virtual object as a graspable portion of the virtual object.

In operation 310, the grasp detection pipeline 338 provides the grasp detection data 342 to the XR application 326 for use as a user input to the images 352. For example, the grasp detection data 342 includes a binary indication of whether the user is grasping the virtual object 314. If the binary indication indicates that user 330 is grasping the virtual object 314, the XR application 326 generates an audio-visual feedback signal in the XR user interface 312 to indicate to the user 330 that the user is grasping the virtual object 314. For example, the audio-visual feedback signal can be a change in an appearance of the virtual object, a change in a representation of the user's hand, an audio prompt, or the like.

In some examples, the grasp detection data 342 includes a grasp confidence level. The XR application 326 uses the grasp confidence level to change an appearance of the virtual object 314 to indicate that the user 330 is getting close to grasping the virtual object 314. In some examples, the XR application 326 uses the grasp confidence level to modulate an audio-visual feedback signal of the XR user interface 312 to indicate to the user 330 that the user is getting close to grasping the virtual object 314, such as by modulating a tone, a volume, or the like of the audio-visual feedback signal.

In some examples, the grasp detection data 342 includes a grasp type of the grasp being made by the user 330 when grasping the virtual object 314. The XR system determines an intent of the user 330 based on the grasp type. The XR system determines the intent of the user 330 by distinguishing between different types of operations that the user 330 wants to perform based on how the user 330 has grasped the virtual object.

In some examples, the user 330 interacts with a pen virtual object that can be used to initiate drawing virtual lines within the XR user interface 312. By grasping the pen virtual object with a small diameter grasp 426, the user signals their intent to move the pen virtual object to a new location in the XR user interface 312. The XR system detects that the user 330 has grasped the pen virtual object with the small diameter grasp 426 and determines the intent of the user 330 is to move the pen virtual object to a new location in the XR user interface 312. However, if the user grasps the pen virtual object with a thumb-2 finger grasp 420, the XR system detects the thumb-2 finger grasp 420 and determines that the intent of the user is to begin drawing virtual lines with the pen virtual object.

In some examples, a user interacts with a baseball virtual object that can be virtually pitched within an XR experience of an XR system. The XR system determines a type of a virtual pitch based on a detecting a grasp being made by the user 330 of the baseball virtual object. A detected grasp may include a 4-seam fastball grasp, a 2-seam fastball grasp, a splitter grasp, a cutter grasp, a slider grasp, a change-up grasp, a curve grasp, and the like.

Figure 4:
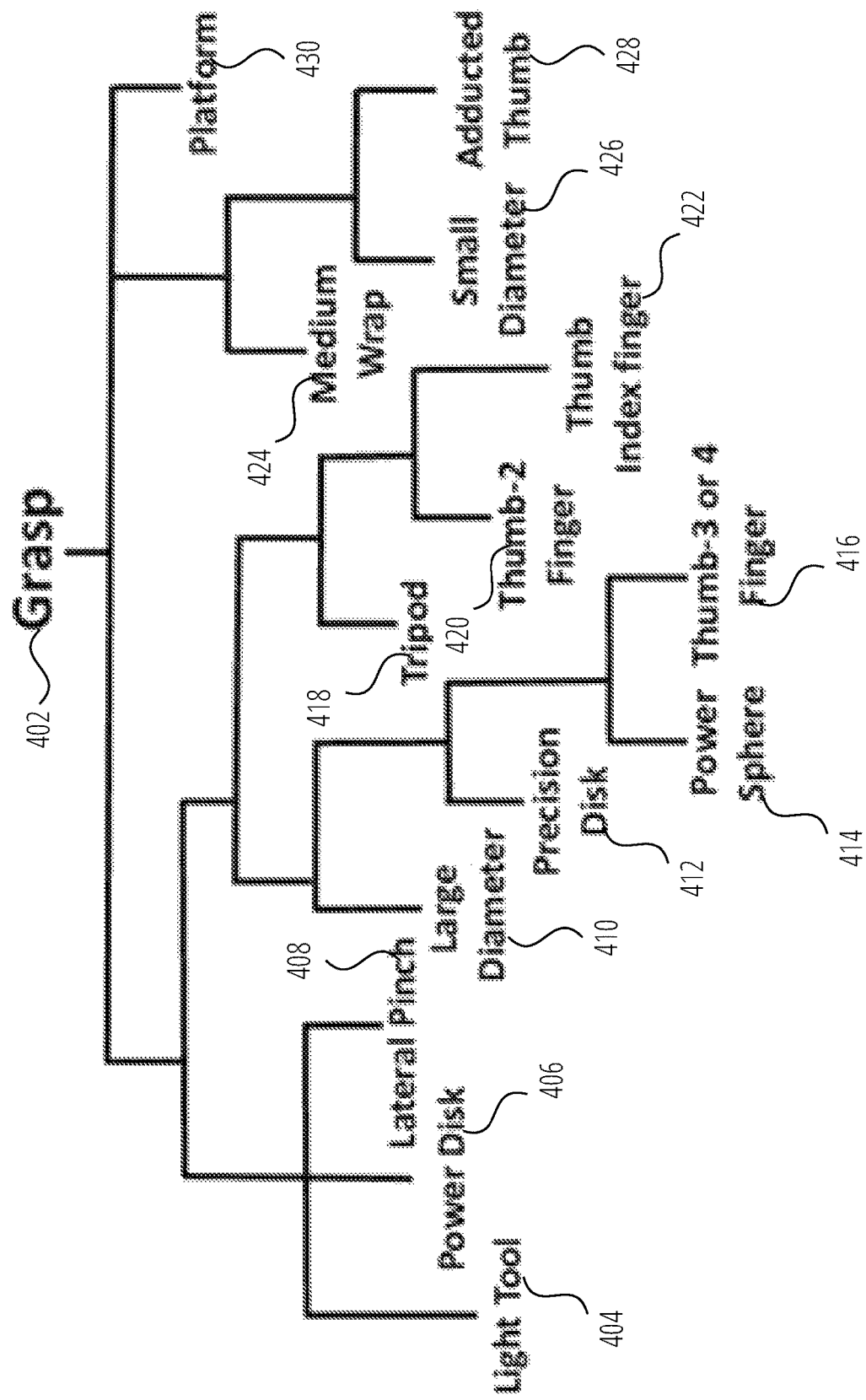
FIG. 4 is an illustration of a grasp taxonomy, in accordance with some examples.

FIG. 4 is an illustration of a grasp taxonomy, in accordance with some examples. A grasp 402 may have a grasp type of a light tool grasp 404, a power disk grasp 406, a lateral pinch grasp 408, a large diameter grasp 410, a precision disk grasp 412, a power sphere grasp 414, a thumb-3 or 4 finger grasp 416, a tripod grasp 418, a thumb-2 finger grasp 420, a thumb index finger 422, a medium wrap grasp 424, a small diameter grasp 426, an adducted thumb grasp 428, a platform grasp 430, or the like.

Networked Computing Environment

Figure 5:
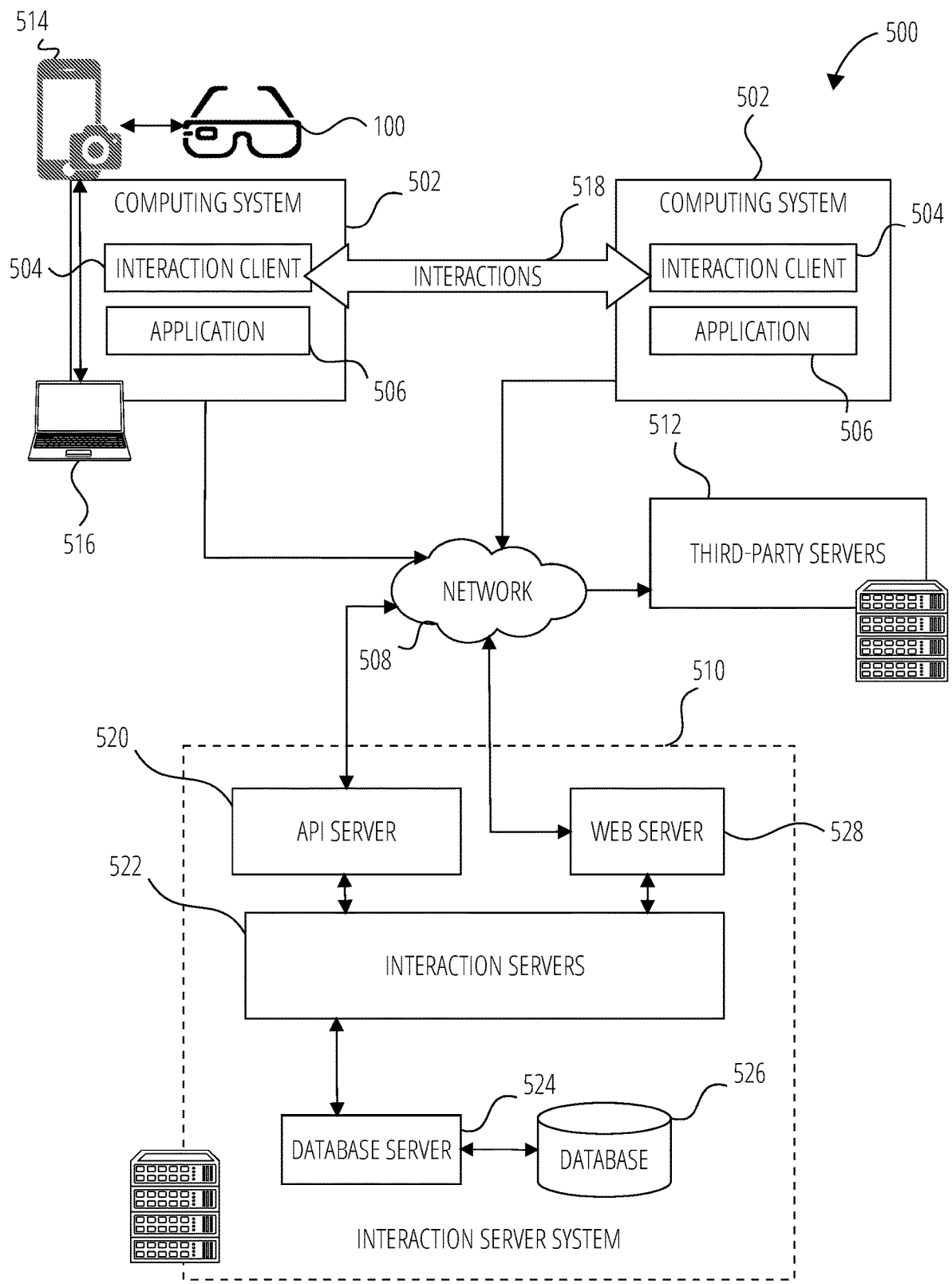
FIG. 5 is a diagrammatic representation of a networked environment in which the present disclosure may be deployed, in accordance with some examples.

FIG. 5 is a block diagram showing an example interaction system 500 for facilitating interactions (e.g., exchanging text messages, conducting text audio and video calls, or playing games) over a network. The interaction system 500 includes multiple XR systems 502, each of which hosts multiple applications, including an interaction client 504 and other applications 506. Each interaction client 504 is communicatively coupled, via one or more communication networks including a network 508 (e.g., the Internet), to other instances of the interaction client 504 (e.g., hosted on respective other XR systems 502), an interaction server system 510 and third-party servers 512). An interaction client 504 can also communicate with locally hosted applications 506 using Applications Program Interfaces (APIs).

Each computing system 502 may comprise one or more user devices, such as a mobile device 514, head-wearable apparatus 100, and a computer client device 516 that are communicatively connected to exchange data and messages.

An interaction client 504 interacts with other interaction clients 504 and with the interaction server system 510 via the network 508. The data exchanged between the interaction clients 504 (e.g., interactions 518) and between the interaction clients 504 and the interaction server system 510 includes functions (e.g., commands to invoke functions) and payload data (e.g., text, audio, video, or other multimedia data).

The interaction server system 510 provides server-side functionality via the network 508 to the interaction clients 504. While certain functions of the interaction system 500 are described herein as being performed by either an interaction client 504 or by the interaction server system 510, the location of certain functionality either within the interaction client 504 or the interaction server system 510 may be a design choice. For example, it may be technically preferable to initially deploy particular technology and functionality within the interaction server system 510 but to later migrate this technology and functionality to the interaction client 504 where a computing system 502 has sufficient processing capacity.

The interaction server system 510 supports various services and operations that are provided to the interaction clients 504. Such operations include transmitting data to, receiving data from, and processing data generated by the interaction clients 504. This data may include message content, client device information, geolocation information, media augmentation and overlays, message content persistence conditions, social network information, and live event information. Data exchanges within the interaction system 500 are invoked and controlled through functions available via user interfaces (UIs) of the interaction clients 504.

Turning now specifically to the interaction server system 510, an Application Program Interface (API) server 520 is coupled to and provides programmatic interfaces to Interaction servers 522, making the functions of the Interaction servers 522 accessible to interaction clients 504, other applications 506 and third-party server 512. The Interaction servers 522 are communicatively coupled to a database server 524, facilitating access to a database 526 that stores data associated with interactions processed by the Interaction servers 522. Similarly, a web server 528 is coupled to the Interaction servers 522 and provides web-based interfaces to the Interaction servers 522. To this end, the web server 528 processes incoming network requests over the Hypertext Transfer Protocol (HTTP) and several other related protocols.

The Application Program Interface (API) server 520 receives and transmits interaction data (e.g., commands and message payloads) between the Interaction servers 522 and the XR systems 502 (and, for example, interaction clients 504 and other application 506) and the third-party server 512. Specifically, the Application Program Interface (API) server 520 provides a set of interfaces (e.g., routines and protocols) that can be called or queried by the interaction client 504 and other applications 506 to invoke functionality of the Interaction servers 522. The Application Program Interface (API) server 520 exposes various functions supported by the Interaction servers 522, including account registration; login functionality; the sending of interaction data, via the Interaction servers 522, from a particular interaction client 504 to another interaction client 504; the communication of media files (e.g., images or video) from an interaction client 504 to the Interaction servers 522; the settings of a collection of media data (e.g., a story); the retrieval of a list of friends of a user of a computing system 502; the retrieval of messages and content; the addition and deletion of entities (e.g., friends) to an entity graph (e.g., a social graph); the location of friends within a social graph; and opening an application event (e.g., relating to the interaction client 504).

The interaction servers 522 host multiple systems and subsystems, described below with reference to FIG. 8.

Linked Applications

Returning to the interaction client 504, features and functions of an external resource (e.g., a linked application 506 or applet) are made available to a user via an interface of the interaction client 504. In this context, "external" refers to the fact that the application 506 or applet is external to the interaction client 504. The external resource is often provided by a third party but may also be provided by the creator or provider of the interaction client 504. The interaction client 504 receives a user selection of an option to launch or access features of such an external resource. The external resource may be the application 506 installed on the computing system 502 (e.g., a "native app"), or a small-scale version of the application (e.g., an "applet") that is hosted on the computing system 502 or remote of the computing system 502 (e.g., on third-party servers 512). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 504. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 504 determines whether the selected external resource is a web-based external resource or a locally-installed application 506. In some cases, applications 506 that are locally installed on the computing system 502 can be launched independently of and separately from the interaction client 504, such as by selecting an icon corresponding to the application 506 on a home screen of the computing system 502. Small-scale versions of such applications can be launched or accessed via the interaction client 504 and, in some examples, no or limited portions of the small-scale application can be accessed outside of the interaction client 504. The small-scale application can be launched by the interaction client 504 receiving, from a third-party server 512 for example, a markup-language document associated with the small-scale application and processing such a document.

In response to determining that the external resource is a locally-installed application 506, the interaction client 504 instructs the computing system 502 to launch the external resource by executing locally-stored code corresponding to the external resource. In response to determining that the external resource is a web-based resource, the interaction client 504 communicates with the third-party servers 512 (for example) to obtain a markup-language document corresponding to the selected external resource. The interaction client 504 then processes the obtained markup-language document to present the web-based external resource within a user interface of the interaction client 504.

The interaction client 504 can notify a user of the computing system 502, or other users related to such a user (e.g., "friends"), of activity taking place in one or more external resources. For example, the interaction client 504 can provide participants in a conversation (e.g., a chat session) in the interaction client 504 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 504, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 504. The external resource can selectively include different media items in the responses, based on a current context of the external resource.

The interaction client 504 can present a list of the available external resources (e.g., applications 506 or applets) to a user to launch or access a given external resource. This list can be presented in a context-sensitive menu. For example, the icons representing different ones of the application 506 (or applets) can vary based on how the menu is launched by the user (e.g., from a conversation interface or from a non-conversation interface).

System with Head-Wearable Apparatus

Figure 6:
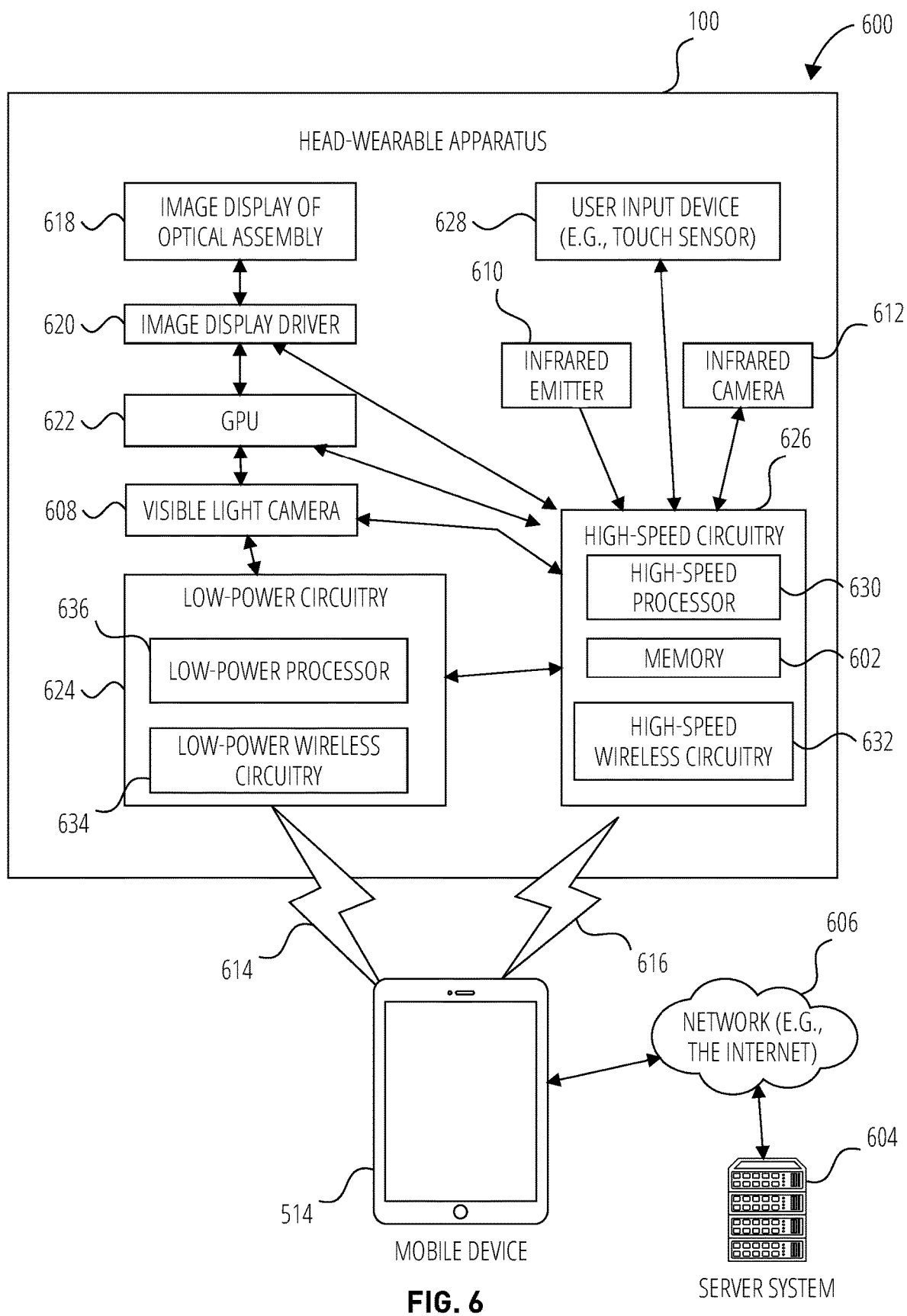
FIG. 6 illustrates a system of a head-wearable apparatus, in accordance with some examples.

FIG. 6 illustrates a system 600 including a head-wearable apparatus 100 with a selector input device, according to some examples. FIG. 6 is a high-level functional block diagram of an example head-wearable apparatus 100 communicatively coupled to a mobile device 514 and various server systems 604 (e.g., the interaction server system 510) via various networks 508.

The head-wearable apparatus 100 includes one or more cameras, each of which may be, for example, a visible light camera 608, an infrared emitter 610, and an infrared camera 612.

The mobile device 514 connects with head-wearable apparatus 100 using both a low-power wireless connection 614 and a high-speed wireless connection 616. The mobile device 514 is also connected to the server system 604 and the network 606.

The head-wearable apparatus 100 further includes two image displays of the image display of optical assembly 618. The two image displays of optical assembly 618 include one associated with the left lateral side and one associated with the right lateral side of the head-wearable apparatus 100. The head-wearable apparatus 100 also includes an image display driver 620, and a GPU 622. The image display of optical assembly 618, image display driver 620, and GPU 622 constitute an optical engine of the head-wearable apparatus 100, low-power circuitry 624, and high-speed circuitry 626. The image display of optical assembly 618 is for presenting images and videos, including an image that can include a graphical user interface to a user of the head-wearable apparatus 100.

The image display driver 620 commands and controls the image display of optical assembly 618. The image display driver 620 may deliver image data directly to the image display of optical assembly 618 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 100 includes a frame and stems (or temples) extending from a lateral side of the frame. The head-wearable apparatus 100 further includes a user input device 628 (e.g., touch sensor or push button), including an input surface on the head-wearable apparatus 100. The user input device 628 (e.g., touch sensor or push button) is to receive from the user an input selection to manipulate the graphical user interface of the presented image.

The components shown in FIG. 6 for the head-wearable apparatus 100 are located on one or more circuit boards, for example a PCB or flexible PCB, in the rims or temples. Alternatively, or additionally, the depicted components can be located in the chunks, frames, hinges, or bridge of the head-wearable apparatus 100. Left and right visible light cameras 608 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 100 includes a memory 602, which stores instructions to perform a subset or all of the functions described herein. The memory 602 can also include storage device.

As shown in FIG. 6, the high-speed circuitry 626 includes a high-speed processor 630, a memory 602, and high-speed wireless circuitry 632. In some examples, the image display driver 620 is coupled to the high-speed circuitry 626 and operated by the high-speed processor 630 in order to drive the left and right image displays of the image display of optical assembly 618. The high-speed processor 630 may be any processor capable of managing high-speed communications and operation of any general computing system needed for the head-wearable apparatus 100. The high-speed processor 630 includes processing resources needed for managing high-speed data transfers on a high-speed wireless connection 616 to a wireless local area network (WLAN) using the high-speed wireless circuitry 632. In certain examples, the high-speed processor 630 executes an operating system such as a LINUX operating system or other such operating system of the head-wearable apparatus 100, and the operating system is stored in the memory 602 for execution. In addition to any other responsibilities, the high-speed processor 630 executing a software architecture for the head-wearable apparatus 100 is used to manage data transfers with high-speed wireless circuitry 632. In certain examples, the high-speed wireless circuitry 632 is configured to implement Institute of Electrical and Electronic Engineers (IEEE) 802.11 communication standards, also referred to herein as WiFi. In some examples, other high-speed communications standards may be implemented by the high-speed wireless circuitry 632.

The low-power wireless circuitry 634 and the high-speed wireless circuitry 632 of the head-wearable apparatus 100 can include short-range transceivers (Bluetooth™) and wireless wide, local, or wide area network transceivers (e.g., cellular or WiFi). Mobile device 514, including the transceivers communicating via the low-power wireless connection 614 and the high-speed wireless connection 616, may be implemented using details of the architecture of the head-wearable apparatus 100, as can other elements of the network 606.

The memory 602 includes any storage device capable of storing various data and applications, including, among other things, camera data generated by the left and right visible light cameras 608, the infrared camera 612, and the GPU 622, as well as images generated for display by the image display driver 620 on the image displays of the image display of optical assembly 618. While the memory 602 is shown as integrated with high-speed circuitry 626, in some examples, the memory 602 may be an independent standalone element of the head-wearable apparatus 100. In certain such examples, electrical routing lines may provide a connection through a chip that includes the high-speed processor 630 from the GPU 622 or the low-power processor 636 to the memory 602. In some examples, the high-speed processor 630 may manage addressing of the memory 602 such that the low-power processor 636 will boot the high-speed processor 630 any time that a read or write operation involving memory 602 is needed.

As shown in FIG. 6, the low-power processor 636 or high-speed processor 630 of the head-wearable apparatus 100 can be coupled to the camera (visible light camera 608, infrared emitter 610, or infrared camera 612), the image display driver 620, the user input device 628 (e.g., touch sensor or push button), and the memory 602.

The head-wearable apparatus 100 is connected to a host computer. For example, the head-wearable apparatus 100 is paired with the mobile device 514 via the high-speed wireless connection 616 or connected to the server system 604 via the network 606. The server system 604 may be one or more computing devices as part of a service or network computing system, for example, that includes a processor, a memory, and network communication interface to communicate over the network 606 with the mobile device 514 and the head-wearable apparatus 100.

The mobile device 514 includes a processor and a network communication interface coupled to the processor. The network communication interface allows for communication over the network 606, low-power wireless connection 614, or high-speed wireless connection 616. Mobile device 514 can further store at least portions of the instructions for generating binaural audio content in the mobile device 514's memory to implement the functionality described herein.

Output components of the head-wearable apparatus 100 include visual components, such as a display such as a liquid crystal display (LCD), a plasma display panel (PDP), a light-emitting diode (LED) display, a projector, or a waveguide. The image displays of the optical assembly are driven by the image display driver 620. The output components of the head-wearable apparatus 100 further include acoustic components (e.g., speakers), haptic components (e.g., a vibratory motor), other signal generators, and so forth. The input components of the head-wearable apparatus 100, the mobile device 514, and server system 604, such as the user input device 628, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 100 may also include additional peripheral device elements. Such peripheral device elements may include biometric sensors, additional sensors, or display elements integrated with the head-wearable apparatus 100. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 614 and high-speed wireless connection 616 from the mobile device 514 via the low-power wireless circuitry 634 or high-speed wireless circuitry 632.

Data Architecture

Figure 7:
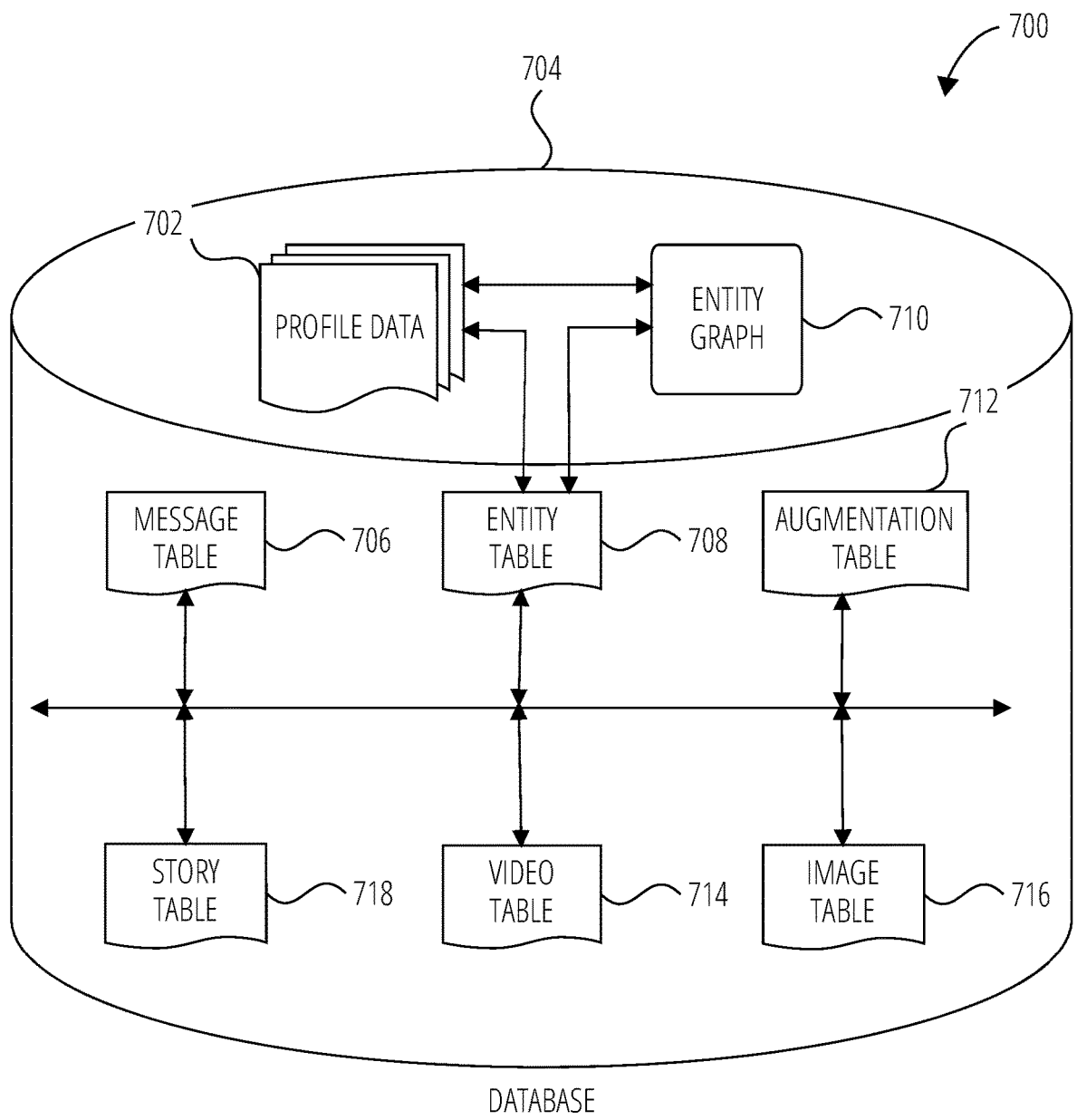
FIG. 7 is a diagrammatic representation of a data structure as maintained in a database, in accordance with some examples.

FIG. 7 is a schematic diagram illustrating data structures 700, which may be stored in the database 704 of the interaction server system 510, according to certain examples. While the content of the database 704 is shown to comprise multiple tables, it will be appreciated that the data could be stored in other types of data structures (e.g., as an object-oriented database).

The database 704 includes message data stored within a message table 706. This message data includes, for any particular message, at least message sender data, message recipient (or receiver) data, and a payload. Further details regarding information that may be included in a message, and included within the message data stored in the message table 706, are described below with reference to FIG. 7.

An entity table 708 stores entity data, and is linked (e.g., referentially) to an entity graph 710 and profile data 702. Entities for which records are maintained within the entity table 708 may include individuals, corporate entities, organizations, objects, places, events, and so forth. Regardless of entity type, any entity regarding which the interaction server system 510 stores data may be a recognized entity. Each entity is provided with a unique identifier, as well as an entity type identifier (not shown).

The entity graph 710 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 500.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 708. Such privacy settings may be applied to all types of relationships within the context of the interaction system 500, or may selectively be applied to only certain types of relationships.

The profile data 702 stores multiple types of profile data about a particular entity. The profile data 702 may be selectively used and presented to other users of the interaction system 500 based on privacy settings specified by a particular entity. Where the entity is an individual, the profile data 702 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 500, and on map interfaces displayed by interaction clients 504 to other users. The collection of avatar representations may include "status avatars," which present a graphical representation of a status or activity that the user may select to communicate at a particular time.

Where the entity is a group, the profile data 702 for the group may similarly include one or more avatar representations associated with the group, in addition to the group name, members, and various settings (e.g., notifications) for the relevant group.

The database 704 also stores augmentation data, such as overlays or filters, in an augmentation table 712. The augmentation data is associated with and applied to videos (for which data is stored in a video table 714) and images (for which data is stored in an image table 716).

Filters, in some examples, are overlays that are displayed as overlaid on an image or video during presentation to a message receiver. Filters may be of various types, including user-selected filters from a set of filters presented to a message sender by the interaction client 504 when the message sender is composing a message. Other types of filters include geolocation filters (also known as geo-filters), which may be presented to a message sender based on geographic location. For example, geolocation filters specific to a neighborhood or special location may be presented within a user interface by the interaction client 504, based on geolocation information determined by a Global Positioning System (GPS) unit of the computing system 502.

Another type of filter is a data filter, which may be selectively presented to a message sender by the interaction client 504 based on other inputs or information gathered by the computing system 502 during the message creation process. Examples of data filters include current temperature at a specific location, a current speed at which a message sender is traveling, battery life for a computing system 502, or the current time.

Other augmentation data that may be stored within the image table 716 includes augmented reality content items (e.g., corresponding to applying Lenses or augmented reality experiences). An augmented reality content item may be a real-time special effect and sound that may be added to an image or a video.

As described above, augmentation data includes AR, VR, and mixed reality (MR) content items, overlays, image transformations, images, and modifications that may be applied to image data (e.g., videos or images). This includes real-time modifications, which modify an image as it is captured using device sensors (e.g., one or multiple cameras) of the computing system 502 and then displayed on a screen of the computing system 502 with the modifications. This also includes modifications to stored content, such as video clips in a collection or group that may be modified. For example, in a computing system 502 with access to multiple augmented reality content items, a user can use a single video clip with multiple augmented reality content items to see how the different augmented reality content items will modify the stored clip. Similarly, real-time video capture may use modifications to show how video images currently being captured by sensors of a computing system 502 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo-random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In some examples, tracking of points on an object may be used to place an image or texture (which may be two-dimensional or three-dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each element of the object. This mesh is used in the following stage of tracking the elements of the object in the video stream. In the process of tracking, the mesh for each element is aligned with a position of each element. Then, additional points are generated on the mesh.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing the color of areas; removing some part of areas from the frames of the video stream; including new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image using a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, visual features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

A transformation system can capture an image or video stream on a client device (e.g., the computing system 502) and perform complex image manipulations locally on the computing system 502 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the computing system 502.

In some examples, a computer animation model to transform image data can be used by a system where a user may capture an image or video stream of the user (e.g., a selfie) using the computing system 502 having a neural network operating as part of an interaction client 504 operating on the computing system 502. The transformation system operating within the interaction client 504 determines the presence of a face within the image or video stream and provides modification icons associated with a computer animation model to transform image data, or the computer animation model can be present as associated with an interface described herein. The modification icons include changes that are the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the computing system 502 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browsing to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 718 stores data regarding collections of messages and associated image, video, or audio data, which are compiled into a collection (e.g., a story or a gallery). The creation of a particular collection may be initiated by a particular user (e.g., each user for which a record is maintained in the entity table 708). A user may create a "personal story" in the form of a collection of content that has been created and sent/broadcast by that user. To this end, the user interface of the interaction client 504 may include an icon that is user-selectable to enable a message sender to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 504, to contribute content to a particular live story. The live story may be identified to the user by the interaction client 504, based on his or her location. The end result is a "live story" told from a community perspective.

A further type of content collection is known as a "location story," which enables a user whose computing system 502 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 714 stores video data that, in some examples, is associated with messages for which records are maintained within the message table 706. Similarly, the image table 716 stores image data associated with messages for which message data is stored in the entity table 708. The entity table 708 may associate various augmentations from the augmentation table 712 with various images and videos stored in the image table 716 and the video table 714.

The databases 704 also includes social network information collected by the social network system 822.

System Architecture

Figure 8:
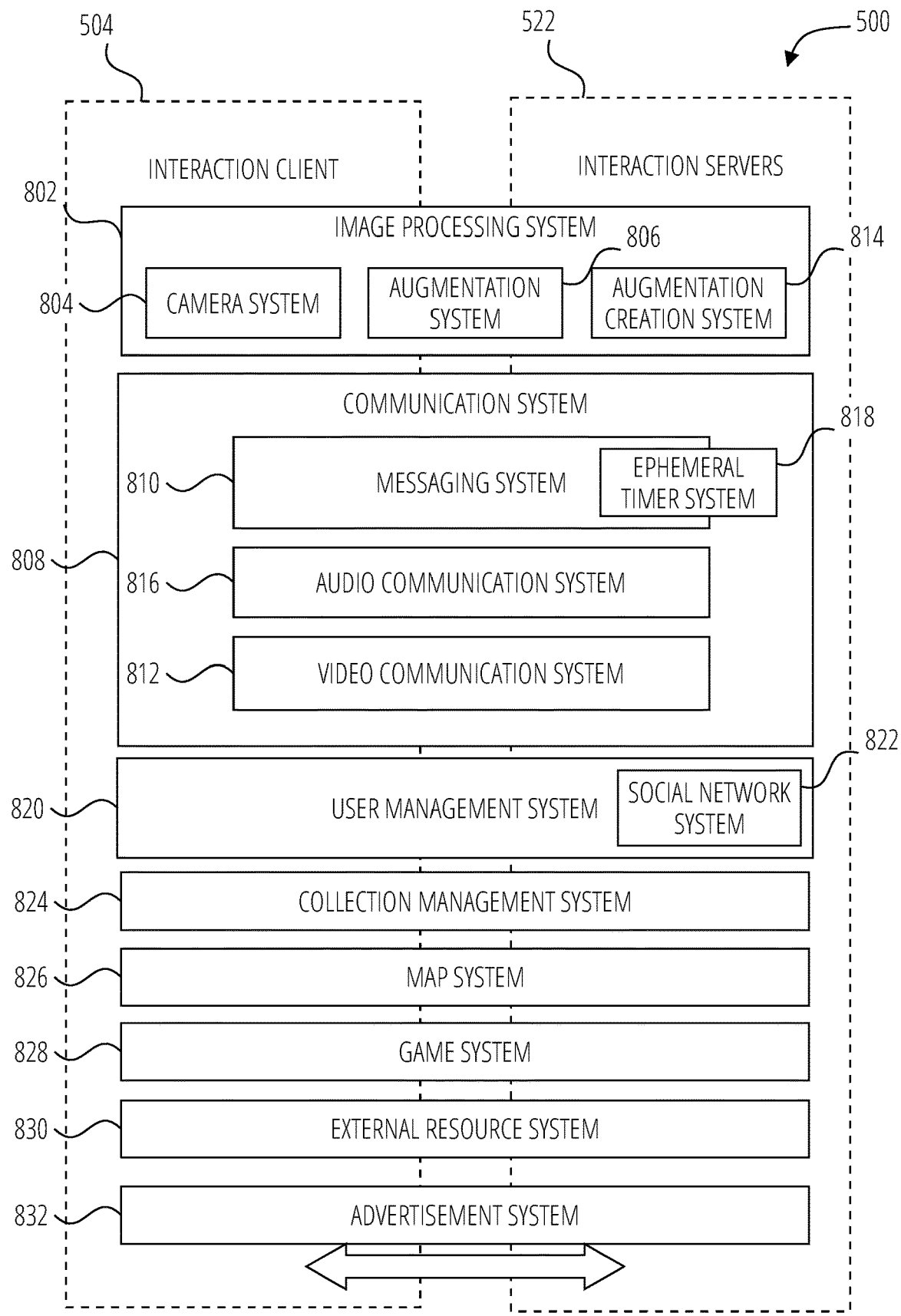
FIG. 8 is a diagrammatic representation of a messaging system that has both client-side and server-side functionality, in accordance with some examples.

FIG. 8 is a block diagram illustrating further details regarding the interaction system 500, according to some examples. Specifically, the interaction system 500 is shown to comprise the interaction client 504 and the Interaction servers 522. The interaction system 500 embodies multiple subsystems, which are supported on the client-side by the interaction client 504 and on the server-side by the Interaction servers 522. Example subsystems are discussed below.

An image processing system 802 provides various functions that enable a user to capture and augment (e.g., augment or otherwise modify or edit) media content associated with a message.

A camera system 804 includes control software (e.g., in a camera application) that interacts with and controls hardware camera hardware (e.g., directly or via operating system controls) of the computing system 502 to modify and augment real-time images captured and displayed via the interaction client 504.

The augmentation system 806 provides functions related to the generation and publishing of augmentations (e.g., media overlays) for images captured in real-time by cameras of the computing system 502 or retrieved from memory of the computing system 502. For example, the augmentation system 806 operatively selects, presents, and displays media overlays (e.g., an image filter or an image lens) to the interaction client 504 for the augmentation of real-time images received via the camera system 804 or stored images retrieved from memory 602 of a computing system 502. These augmentations are selected by the augmentation system 806 and presented to a user of an interaction client 504, based on a number of inputs and data, such as for example:

Geolocation of the computing system 502; and

Social network information of the user of the computing system 502.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at computing system 502 for communication in a message, or applied to video content, such as a video content stream or feed transmitted from an interaction client 504. As such, the image processing system 802 may interact with, and support, the various subsystems of the communication system 808, such as the messaging system 810 and the video communication system 812.

A media overlay may include text or image data that can be overlaid on top of a photograph taken by the computing system 502 or a video stream produced by the computing system 502. In some examples, the media overlay may be a location overlay (e.g., Venice beach), a name of a live event, or a name of a merchant overlay (e.g., Beach Coffee House). In further examples, the image processing system 802 uses the geolocation of the computing system 502 to identify a media overlay that includes the name of a merchant at the geolocation of the computing system 502. The media overlay may include other indicia associated with the merchant. The media overlays may be stored in the databases 526 and accessed through the database server 524.

The image processing system 802 provides a user-based publication platform that enables users to select a geolocation on a map and upload content associated with the selected geolocation. The user may also specify circumstances under which a particular media overlay should be offered to other users. The image processing system 802 generates a media overlay that includes the uploaded content and associates the uploaded content with the selected geolocation.

The augmentation creation system 814 supports augmented reality developer platforms and includes an application for content creators (e.g., artists and developers) to create and publish augmentations (e.g., augmented reality experiences) of the interaction client 504. The augmentation creation system 814 provides a library of built-in features and tools to content creators including, for example custom shaders, tracking technology, and templates.

In some examples, the augmentation creation system 814 provides a merchant-based publication platform that enables merchants to select a particular augmentation associated with a geolocation via a bidding process. For example, the augmentation creation system 814 associates a media overlay of the highest bidding merchant with a corresponding geolocation for a predefined amount of time.

A communication system 808 is responsible for enabling and processing multiple forms of communication and interaction within the interaction system 500 and includes a messaging system 810, an audio communication system 816, and a video communication system 812. The messaging system 810 is responsible for enforcing the temporary or time-limited access to content by the interaction clients 504. The messaging system 810 incorporates multiple timers (e.g., within an ephemeral timer system 818) that, based on duration and display parameters associated with a message or collection of messages (e.g., a story), selectively enable access (e.g., for presentation and display) to messages and associated content via the interaction client 504. Further details regarding the operation of the ephemeral timer system 818 are provided below. The audio communication system 816 enables and supports audio communications (e.g., real-time audio chat) between multiple interaction clients 504. Similarly, the video communication system 812 enables and supports video communications (e.g., real-time video chat) between multiple interaction clients 504.

A user management system 820 is operationally responsible for the management of user data and profiles, and includes a social network system 822 that maintains social network information regarding relationships between users of the interaction system 500.

A collection management system 824 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 824 may also be responsible for publishing an icon that provides notification of a particular collection to the user interface of the interaction client 504. The collection management system 824 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 824 employs machine vision (or image recognition technology) and content rules to curate a content collection automatically. In certain examples, compensation may be paid to a user to include user-generated content into a collection. In such cases, the collection management system 824 operates to automatically make payments to such users to use their content.

A map system 826 provides various geographic location functions and supports the presentation of map-based media content and messages by the interaction client 504. For example, the map system 826 enables the display of user icons or avatars (e.g., stored in profile data 702) on a map to indicate a current or past location of "friends" of a user, as well as media content (e.g., collections of messages including photographs and videos) generated by such friends, within the context of a map. For example, a message posted by a user to the interaction system 500 from a specific geographic location may be displayed within the context of a map at that particular location to "friends" of a specific user on a map interface of the interaction client 504. A user can furthermore share his or her location and status information (e.g., using an appropriate status avatar) with other users of the interaction system 500 via the interaction client 504, with this location and status information being similarly displayed within the context of a map interface of the interaction client 504 to selected users.

A game system 828 provides various gaming functions within the context of the interaction client 504. The interaction client 504 provides a game interface providing a list of available games that can be launched by a user within the context of the interaction client 504 and played with other users of the interaction system 500. The interaction system 500 further enables a particular user to invite other users to participate in the play of a specific game by issuing invitations to such other users from the interaction client 504. The interaction client 504 also supports audio, video, and text messaging (e.g., chats) within the context of gameplay, provides a leaderboard for the games, and also supports the provision of in-game rewards (e.g., coins and items).

An external resource system 830 provides an interface for the interaction client 504 to communicate with remote servers (e.g., third-party servers 512) to launch or access external resources, i.e., applications or applets. Each third-party server 512 hosts, for example, a markup language (e.g., HTML5) based application or a small-scale version of an application (e.g., game, utility, payment, or ride-sharing application). The interaction client 504 may launch a web-based resource (e.g., application) by accessing the HTML5 file from the third-party servers 512 associated with the web-based resource. Applications hosted by third-party servers 512 are programmed in JavaScript leveraging a Software Development Kit (SDK) provided by the Interaction servers 522. The SDK includes Application Programming Interfaces (APIs) with functions that can be called or invoked by the web-based application. The Interaction servers 522 host a JavaScript library that provides a given external resource access to specific user data of the interaction client 504. HTML5 is an example of technology for programming games, but applications and resources programmed based on other technologies can be used.

To integrate the functions of the SDK into the web-based resource, the SDK is downloaded by the third-party server 512 from the Interaction servers 522 or is otherwise received by the third-party server 512. Once downloaded or received, the SDK is included as part of the application code of a web-based external resource. The code of the web-based resource can then call or invoke certain functions of the SDK to integrate features of the interaction client 504 into the web-based resource.

The SDK stored on the interaction server system 510 effectively provides the bridge between an external resource (e.g., applications 506 or applets) and the interaction client 504. This gives the user a seamless experience of communicating with other users on the interaction client 504 while also preserving the look and feel of the interaction client 504. To bridge communications between an external resource and an interaction client 504, the SDK facilitates communication between third-party servers 512 and the interaction client 504. A WebViewJavaScriptBridge running on a computing system 502 establishes two one-way communication channels between an external resource and the interaction client 504. Messages are sent between the external resource and the interaction client 504 via these communication channels asynchronously. Each SDK function invocation is sent as a message and callback. Each SDK function is implemented by constructing a unique callback identifier and sending a message with that callback identifier.

By using the SDK, not all information from the interaction client 504 is shared with third-party servers 512. The SDK limits which information is shared based on the needs of the external resource. Each third-party server 512 provides an HTML5 file corresponding to the web-based external resource to Interaction servers 522. The Interaction servers 522 can add a visual representation (such as a box art or other graphic) of the web-based external resource in the interaction client 504. Once the user selects the visual representation or instructs the interaction client 504 through a GUI of the interaction client 504 to access features of the web-based external resource, the interaction client 504 obtains the HTML5 file and instantiates the resources to access the features of the web-based external resource.

The interaction client 504 presents a graphical user interface (e.g., a landing page or title screen) for an external resource. During, before, or after presenting the landing page or title screen, the interaction client 504 determines whether the launched external resource has been previously authorized to access user data of the interaction client 504. In response to determining that the launched external resource has been previously authorized to access user data of the interaction client 504, the interaction client 504 presents another graphical user interface of the external resource that includes functions and features of the external resource. In response to determining that the launched external resource has not been previously authorized to access user data of the interaction client 504, after a threshold period of time (e.g., 3 seconds) of displaying the landing page or title screen of the external resource, the interaction client 504 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 504 adds the external resource to a list of authorized external resources and allows the external resource to access user data from the interaction client 504. The external resource is authorized by the interaction client 504 to access the user data under an OAuth 2 framework.

The interaction client 504 controls the type of user data that is shared with external resources based on the type of external resource being authorized. For example, external resources that include full-scale applications (e.g., an application 506) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 832 operationally enables the purchasing of advertisements by third parties for presentation to end-users via the interaction clients 504 and also handles the delivery and presentation of these advertisements.

Software Architecture

Figure 9:
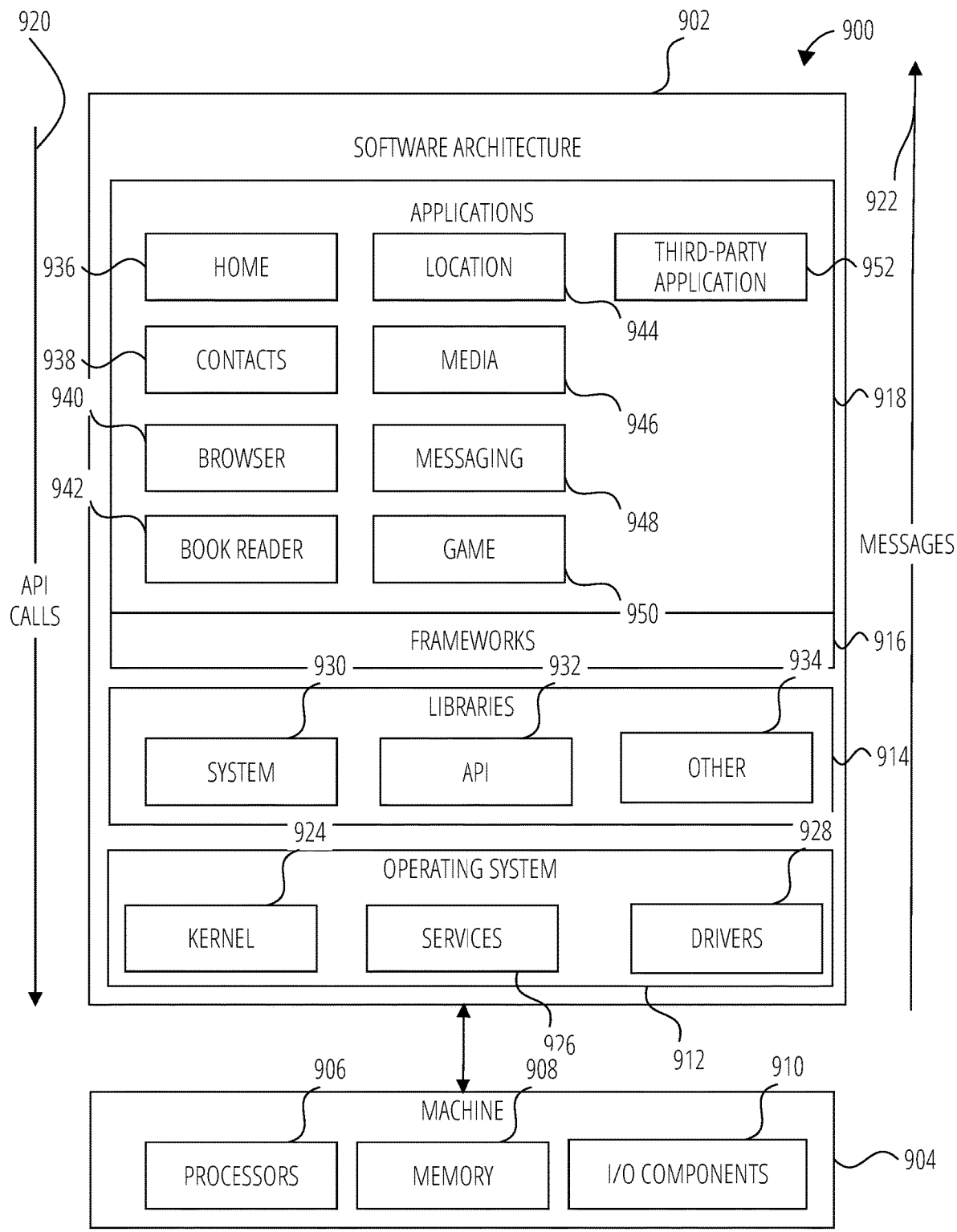
FIG. 9 is a block diagram showing a software architecture, in accordance with some examples.

FIG. 9 is a block diagram 900 illustrating a software architecture 902, which can be installed on any one or more of the devices described herein. The software architecture 902 is supported by hardware such as a machine 904 that includes processors 906, memory 908, and I/O components 910. In this example, the software architecture 902 can be conceptualized as a stack of layers, where each layer provides a particular functionality. The software architecture 902 includes layers such as an operating system 912, libraries 914, frameworks 916, and applications 918. Operationally, the applications 918 invoke API calls 920 through the software stack and receive messages 922 in response to the API calls 920.

The operating system 912 manages hardware resources and provides common services. The operating system 912 includes, for example, a kernel 924, services 926, and drivers 928. The kernel 924 acts as an abstraction layer between the hardware and the other software layers. For example, the kernel 924 provides memory management, processor management (e.g., scheduling), component management, networking, and security settings, among other functionalities. The services 926 can provide other common services for the other software layers. The drivers 928 are responsible for controlling or interfacing with the underlying hardware. For instance, the drivers 928 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 914 provide a common low-level infrastructure used by the applications 918. The libraries 914 can include system libraries 930 (e.g., C standard library) that provide functions such as memory allocation functions, string manipulation functions, mathematic functions, and the like. In addition, the libraries 914 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 914 can also include a wide variety of other libraries 934 to provide many other APIs to the applications 918.

The frameworks 916 provide a common high-level infrastructure that is used by the applications 918. For example, the frameworks 916 provide various graphical user interface (GUI) functions, high-level resource management, and high-level location services. The frameworks 916 can provide a broad spectrum of other APIs that can be used by the applications 918, some of which may be specific to a particular operating system or platform.

In an example, the applications 918 may include a home application 936, a contacts application 938, a browser application 940, a book reader application 942, a location application 944, a media application 946, a messaging application 948, a game application 950, and a broad assortment of other applications such as a third-party application 952. The applications 918 are programs that execute functions defined in the programs. Various programming languages can be employed to create one or more of the applications 918, structured in a variety of manners, such as object-oriented programming languages (e.g., Objective-C, Java, or C++) or procedural programming languages (e.g., C or assembly language). In a specific example, the third-party application 952 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 952 can invoke the API calls 920 provided by the operating system 912 to facilitate functionalities described herein.

Additional examples include:

Example 1 is a computer-implemented method comprising: providing, by one or more processors, a user interface of an XR application to a user of an XR system, the user interface including one or more virtual objects; capturing, by the one or more processors, using one or more cameras of the XR system, video frame tracking data of a pose of a hand of a user while the user interacts with a virtual object of the one or more virtual objects; generating, by the one or more processors, skeletal model data of the hand of the user based on the video frame tracking data, the skeletal model data including one or more skeletal model features corresponding to recognized visual landmarks of portions of the hand of the user; generating, by the one or more processors of the XR system, grasp detection data based on the skeletal model data and virtual object data of the virtual object; and providing, by the one or more processors of the XR system, the grasp detection data to the XR application as user input into the XR application.

Example 2 is the computer-implemented method of Example 1, wherein the skeletal model data further comprises three-dimensional locations of hand joints and the virtual object data comprises three-dimensional vertices on the virtual object's mesh surface.

Example 3 is the computer-implemented method of any of Examples 1-2, wherein the grasp detection data includes a radius of curvature of a grasp being made by the user.

Example 4 is the computer-implemented method of any of Examples 1-3, wherein the grasp detection data includes a binary indication of the user grasping the virtual object.

Example 5 is the computer-implemented method of any of Examples 1-4, wherein the grasp detection data includes a grasp confidence level of the user grasping the virtual object.

Example 6 is the computer-implemented method of any of Examples 1-5, wherein the grasp detection data includes a grasp type of a grasp being made by the user grasping the virtual object.

Example 7 is the computer-implemented method of any of Examples 1-6, wherein the XR system comprises a head-wearable apparatus.

Example 8 is at least one machine-readable medium including instructions that, when executed by processing circuitry, cause the processing circuitry to perform operations to implement any of Examples 1-7.

Example 9 is an apparatus comprising means to implement any of Examples 1-7.

Example 10 is a system to implement any of Examples 1-7.

CONCLUSION

Changes and modifications may be made to the disclosed examples without departing from the scope of the present disclosure. These and other changes or modifications are intended to be included within the scope of the present disclosure, as expressed in the following claims.

Glossary

"Carrier signal" refers to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Machine-readable storage medium" refers to both machine-storage media and transmission media. Thus, the terms include both storage devices/media and carrier waves/modulated data signals. The terms "computer-readable medium," "machine-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory machine-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A machine comprising:
one or more processors; and
a memory storing instructions that, when executed by the one or more processors, cause the machine to perform operations comprising:
providing, by an Augmented Reality (AR) application of an XR system, a user interface to a user of the XR system, the user interface including one or more virtual objects;
capturing, using one or more cameras of the XR system, video frame tracking data of a pose of a hand of a user while the user interacts with a virtual object of the one or more virtual objects;
generating skeletal model data of the hand of the user based on the video frame tracking data, the skeletal model data including one or more skeletal model features corresponding to recognized visual landmarks of portions of the hand of the user;
generating grasp detection data based on the skeletal model data and virtual object data of the virtual object; and
providing the grasp detection data to the XR application as user input into the XR application.

2. The machine of claim 1, wherein the skeletal model data further comprises three-dimensional locations of hand joints and the virtual object data comprises three-dimensional vertices on the virtual object's mesh surface.

3. The machine of claim 2, wherein the grasp detection data includes a radius of curvature of a grasp being made by the user.

4. The machine of claim 1, wherein the grasp detection data includes a binary indication of the user grasping the virtual object.

5. The machine of claim 4, wherein the grasp detection data includes a grasp type of a grasp being made by the user grasping the virtual object.

6. The machine of claim 4, wherein the XR system comprises a head-wearable apparatus.

7. The machine of claim 1, wherein the grasp detection data includes a grasp confidence level of the user grasping the virtual object.

8. A computer-implemented method comprising:
providing, by one or more processors, a user interface of an XR application to a user of an XR system, the user interface including one or more virtual objects;
capturing, by the one or more processors, using one or more cameras of the XR system, video frame tracking data of a pose of a hand of a user while the user interacts with a virtual object of the one or more virtual objects;
generating, by the one or more processors, skeletal model data of the hand of the user based on the video frame tracking data, the skeletal model data including one or more skeletal model features corresponding to recognized visual landmarks of portions of the hand of the user;
generating, by the one or more processors of the XR system, grasp detection data based on the skeletal model data and virtual object data of the virtual object; and
providing, by the one or more processors of the XR system, the grasp detection data to the XR application as user input into the XR application.

9. The computer-implemented method of claim 8, wherein the skeletal model data further comprises three-dimensional locations of hand joints and the virtual object data comprises three-dimensional vertices on the virtual object's mesh surface.

10. The computer-implemented method of claim 8, wherein the grasp detection data includes a radius of curvature of a grasp being made by the user.

11. The computer-implemented method of claim 8, wherein the grasp detection data includes a binary indication of the user grasping the virtual object.

12. The computer-implemented method of claim 8, wherein the grasp detection data includes a grasp confidence level of the user grasping the virtual object.

13. The computer-implemented method of claim 8, wherein the grasp detection data includes a grasp type of a grasp being made by the user grasping the virtual object.

14. The computer-implemented method of claim 8, wherein the XR system comprises a head-wearable apparatus.

15. A non-transitory machine-readable storage medium, the machine-readable storage medium including instructions that when executed by a machine, cause the machine to perform operations comprising:
providing a user interface of an XR application to a user of an XR system, the user interface including one or more virtual objects;
capturing, using one or more cameras of the XR system, video frame tracking data of a pose of a hand of a user while the user interacts with a virtual object of the one or more virtual objects;
generating skeletal model data of the hand of the user based on the video frame tracking data, the skeletal model data including one or more skeletal model features corresponding to recognized visual landmarks of portions of the hand of the user;
generating grasp detection data based on the skeletal model data and virtual object data of the virtual object; and
providing the grasp detection data to the XR application as user input into the XR application.

16. The non-transitory machine-readable storage medium of claim 15, wherein the skeletal model data further comprises three-dimensional locations of hand joints and the virtual object data comprises three-dimensional vertices on the virtual object's mesh surface.

17. The non-transitory machine-readable storage medium of claim 15, wherein the grasp detection data includes a radius of curvature of a grasp being made by the user.

18. The non-transitory machine-readable storage medium of claim 15, wherein the grasp detection data includes a binary indication of the user grasp the virtual object.

19. The non-transitory machine-readable storage medium of claim 15, wherein the grasp detection data includes a grasp confidence level of the user grasp the virtual object.

20. The non-transitory machine-readable storage medium of claim 15, wherein the XR system comprises a head-wearable apparatus.

* * * * *